(12) United States Patent
Jones

(10) Patent No.: US 6,378,030 B1
(45) Date of Patent: *Apr. 23, 2002

(54) METHOD AND APPARATUS FOR PROCESSING VIDEO DATA

(75) Inventor: Anthony Mark Jones, Yate Bristol (GB)

(73) Assignee: Discovision Associates, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,795

(22) Filed: Jun. 14, 1999

Related U.S. Application Data

(62) Division of application No. 08/950,892, filed on Oct. 15, 1997, now Pat. No. 5,956,741, which is a continuation of application No. 08/810,780, filed on Mar. 5, 1997, now abandoned, which is a continuation of application No. 08/399,799, filed on Mar. 7, 1995, now abandoned.

(30) Foreign Application Priority Data

Mar. 24, 1994 (GB) ............................................. 9405914
Feb. 28, 1995 (GB) ............................................. 9503964

(51) Int. Cl.$^7$ ............................................. G06F 12/00
(52) U.S. Cl. ......................................................... 711/1
(58) Field of Search .................... 711/1, 200; 348/446, 348/398; 364/238.6, 239, 926.3, 926.6

(56) References Cited

U.S. PATENT DOCUMENTS

| | | | |
|---|---|---|---|
| 5,138,448 A | | 8/1992 | Gillies et al. ................ 358/140 |
| 5,227,863 A | * | 7/1993 | Bilbrey et al. ................ 358/22 |
| 5,231,605 A | | 7/1993 | Lee ............................ 365/201 |
| 5,265,212 A | | 11/1993 | Bruce ......................... 395/325 |
| 5,881,301 A | * | 3/1999 | Robbins ................ 395/800.01 |
| 5,956,741 A | * | 9/1999 | Jones ............................ 711/1 |

FOREIGN PATENT DOCUMENTS

EP 0468480 1/1992 ............ G11C/7/00

* cited by examiner

Primary Examiner—Kevin Verbrugge
(74) Attorney, Agent, or Firm—Keiji Masaki; Steve Wong; Richard Stokey

(57) ABSTRACT

A configurable RAM interface connecting a bus to RAM is adapted to receiving large multiword variable length tokens at a high data arrival rate, using a swing buffer and a buffer manager. An address source provides complete addresses to the interface. The buffer manager has a state machine which transitions among a plurality of states, maintaining status information about the buffers, allocating the buffers for reference by a write address generator, clearing the buffers for occupation by subsequently arriving data, and maintaining status information concerning the buffers. The buffer manager also examines tokens of received data in order to update the status of the arrival buffer.

22 Claims, 46 Drawing Sheets

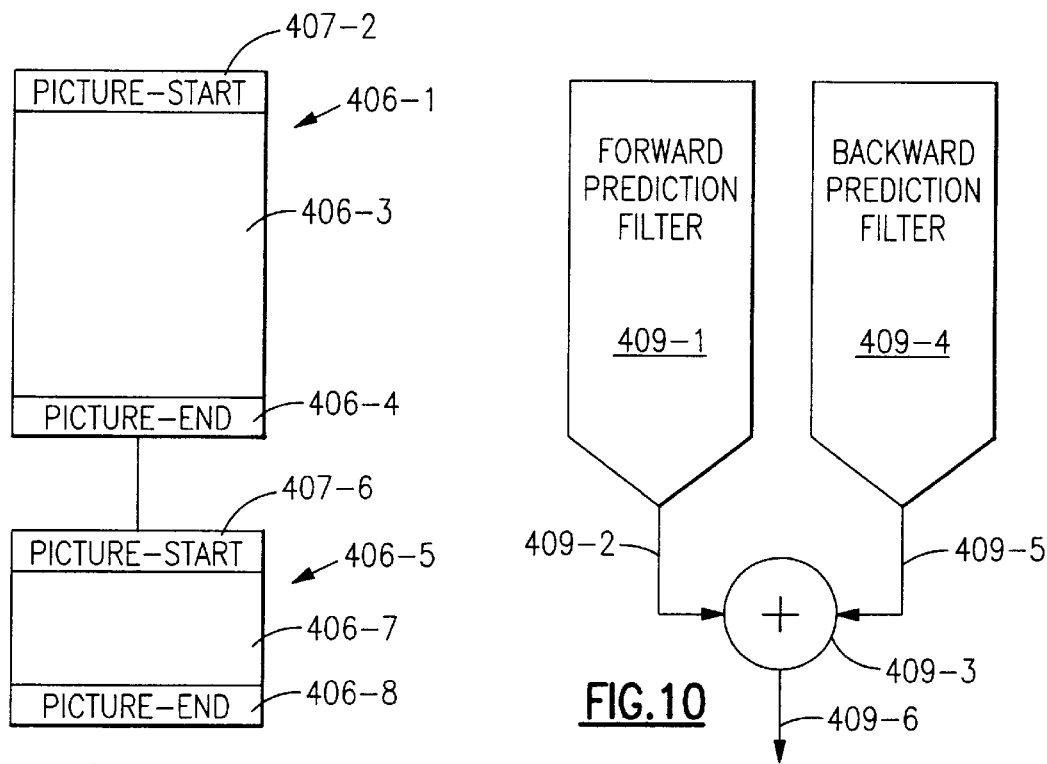
FIG.9
FIG.10
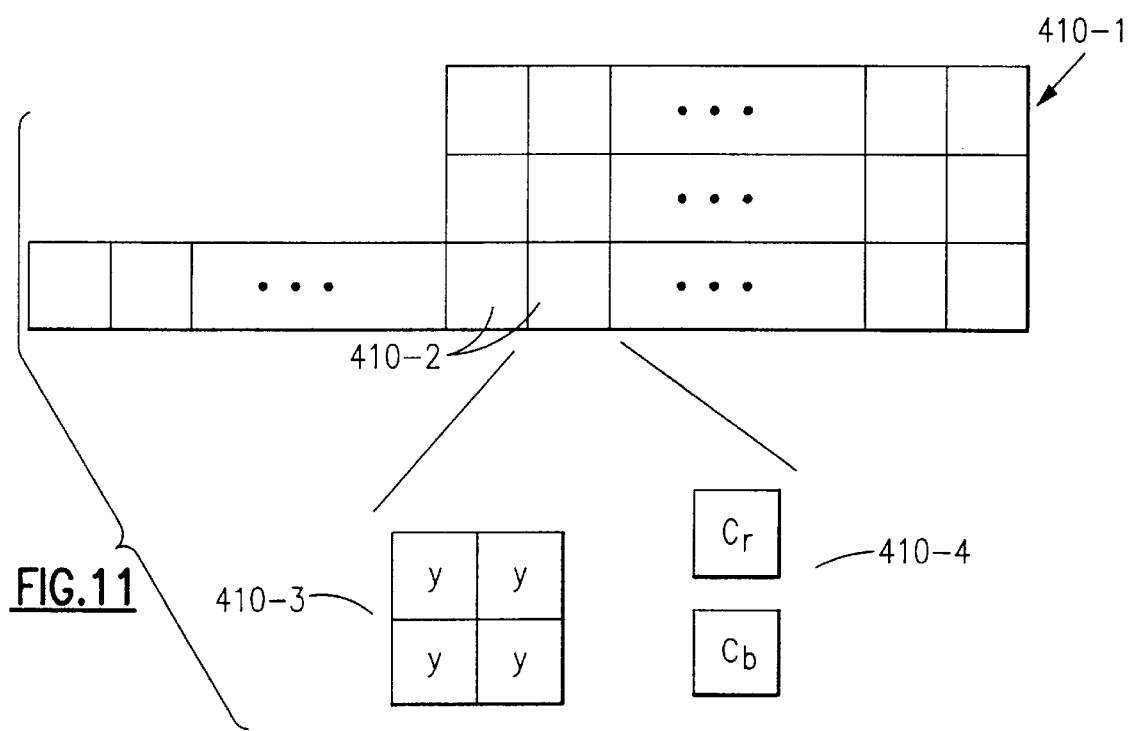
FIG.11

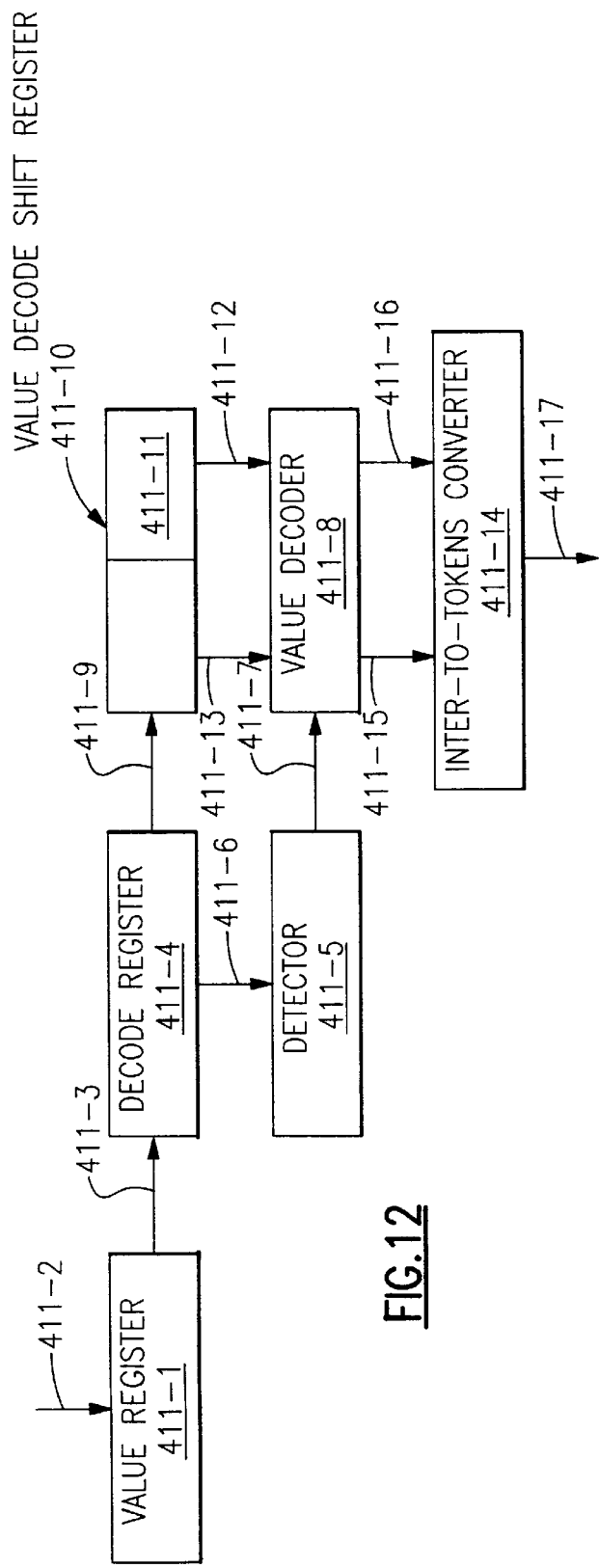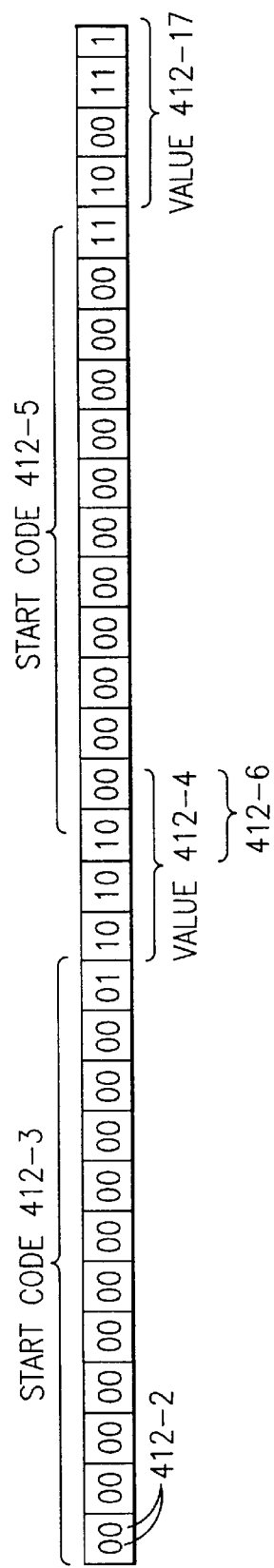
FIG.12
FIG.13

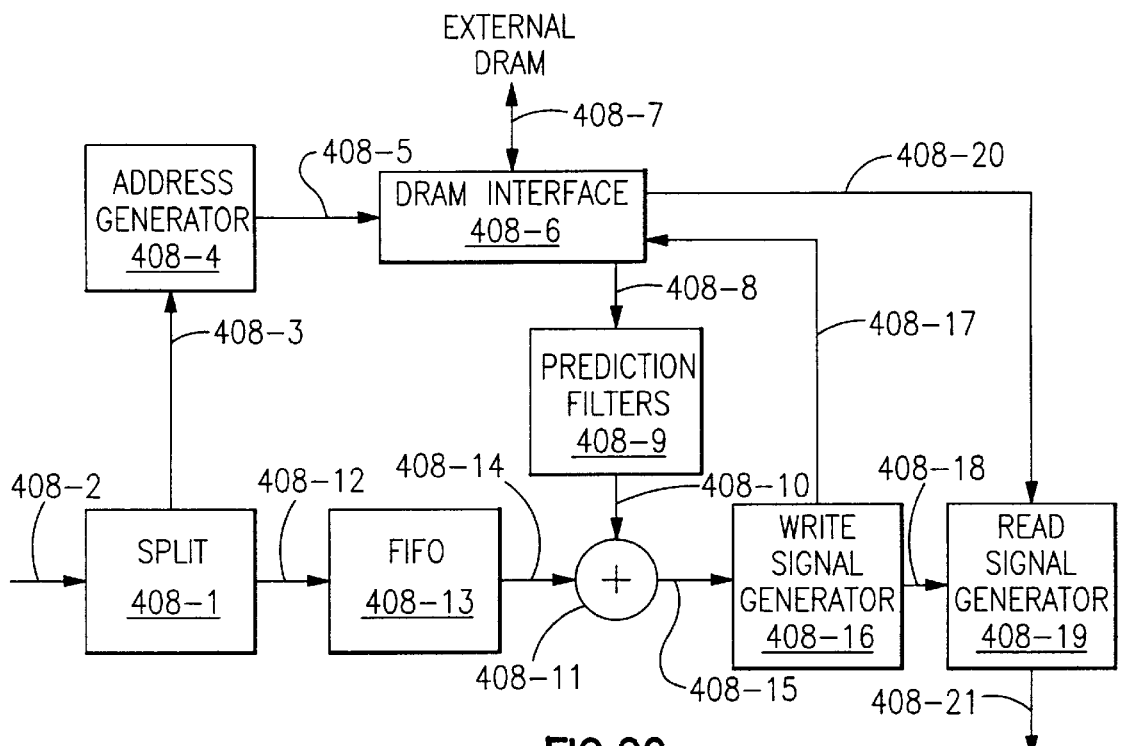
FIG.22
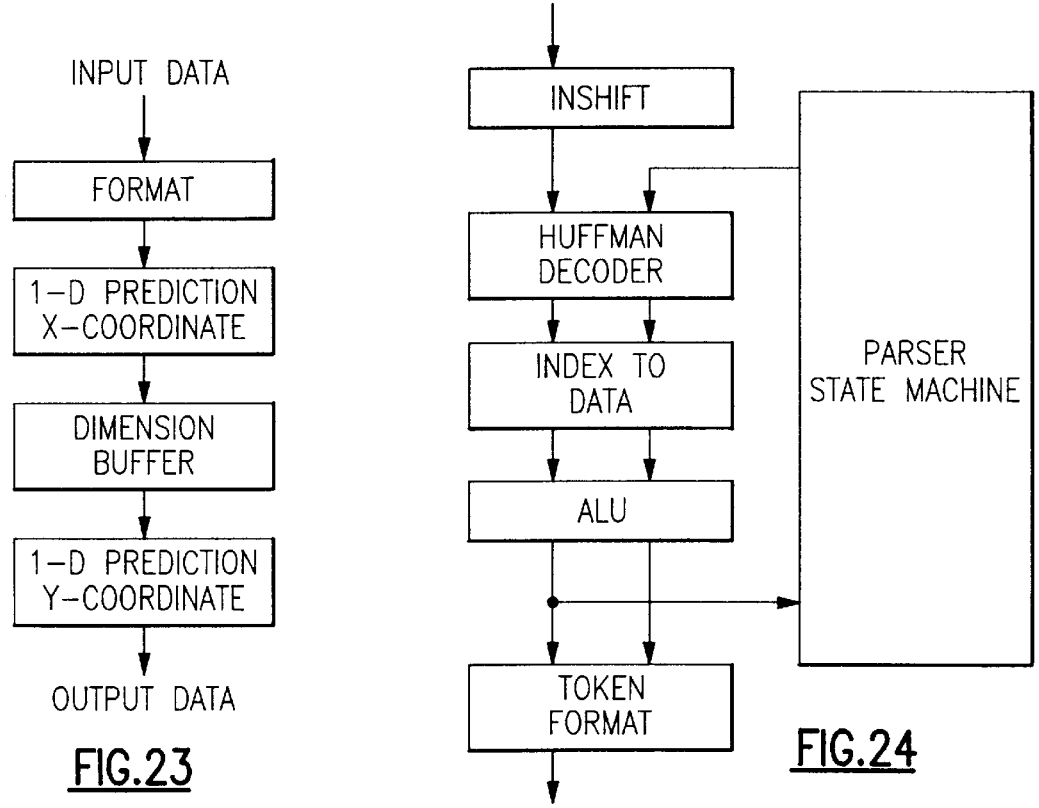
FIG.23
FIG.24

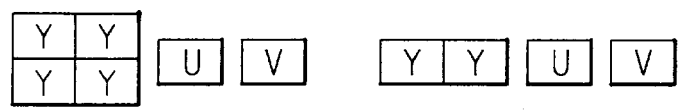
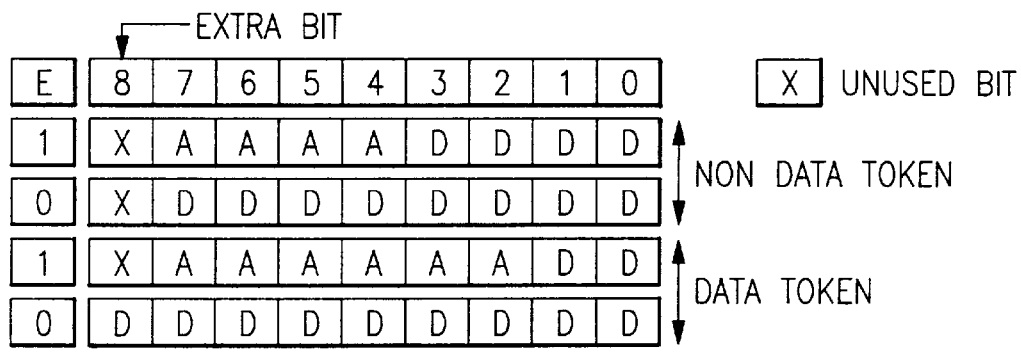
FIG.26
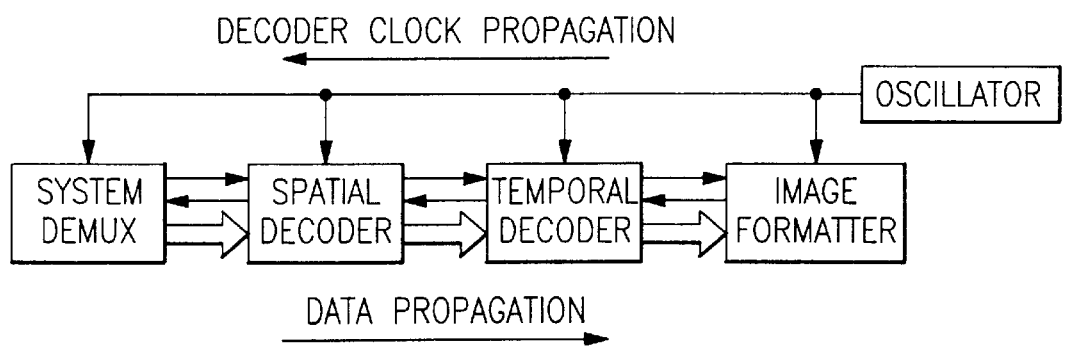
FIG.27

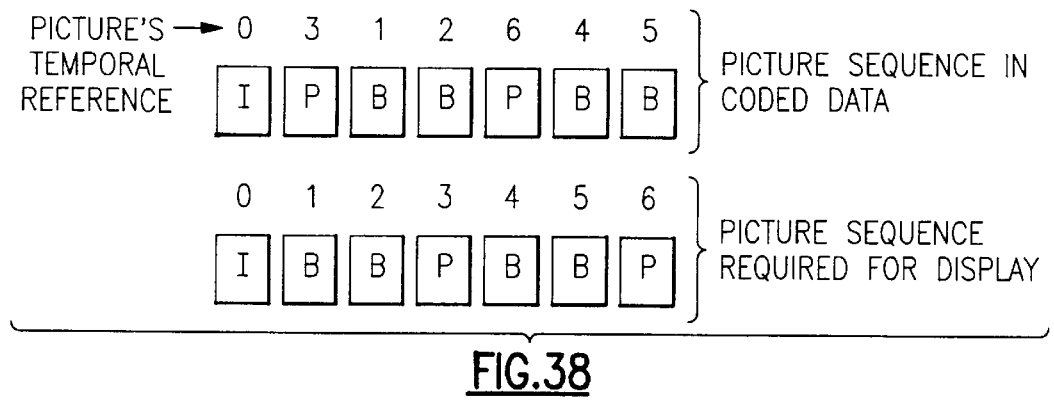
FIG.38
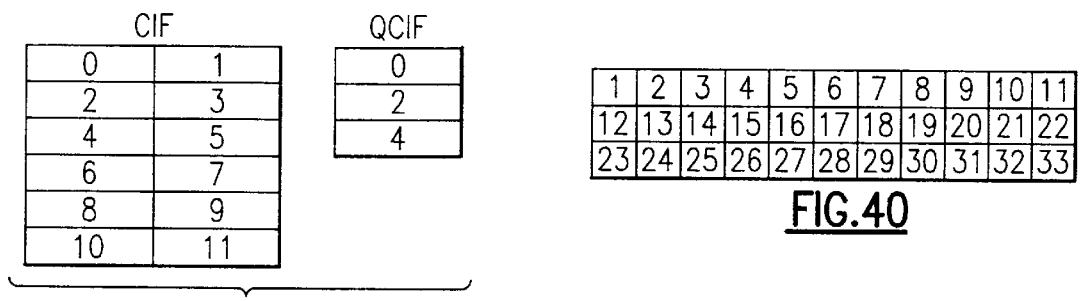
FIG.39
FIG.40
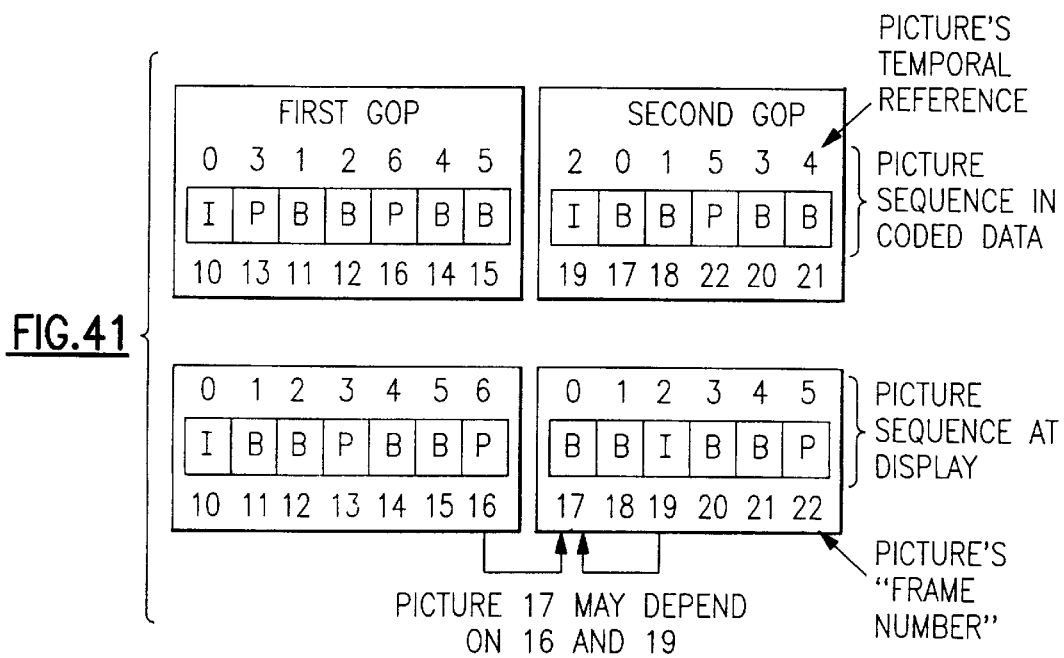
FIG.41

BUFFER OFFSET 0x00:
COMPONENT0 OFFSET 0x00 +......

| 00 | 01 | 02 | 03 | 04 | 05 | 06 | 07 | 08 | 09 | 0A | 0B |
|----|----|----|----|----|----|----|----|----|----|----|----|
| 0C | 0D | 0E | 0F | 10 | 11 | 12 | 13 | 14 | 15 | 16 | 17 |
| 18 | 19 | 1A | 1B | 1C | 1D | 1E | 1F | 20 | 21 | 22 | 23 |
| 24 | 25 | 26 | 27 | 28 | 29 | 2A | 2B | 2C | 2D | 2E | 2F |
| 30 | 31 | 32 | 33 | 34 | 35 | 36 | 37 | 38 | 39 | 3A | 3B |
| 3C | 3D | 3E | 3F | 40 | 41 | 42 | 43 | 44 | 45 | 46 | 47 |
| 48 | 49 | 4A | 4B | 4C | 4D | 4E | 4F | 50 | 51 | 52 | 53 |
| 54 | 55 | 56 | 57 | 58 | 59 | 5A | 5B | 5C | 5D | 5E | 5F |
| 60 | 61 | 62 | 63 | 64 | 65 | 66 | 67 | 68 | 69 | 6A | 6B |
| 6C | 6D | 6E | 6F | 70 | 71 | 72 | 73 | 74 | 75 | 76 | 77 |
| 78 | 79 | 7A | 7B | 7C | 7D | 7E | 7F | 80 | 81 | 82 | 83 |
| 84 | 85 | 86 | 87 | 88 | 89 | 8A | 8B | 8C | 8D | 8E | 8F |

COMPONENT1 OFFSET 0x100 +......

| 00 | 01 | 02 | 03 | 04 | 05 |
|----|----|----|----|----|----|
| 06 | 07 | 08 | 09 | 0A | 0B |
| 0C | 0D | 0E | 0F | 10 | 11 |
| 12 | 13 | 14 | 15 | 16 | 17 |
| 18 | 19 | 1A | 1B | 1C | 1D |
| 1E | 1F | 20 | 21 | 22 | 23 |

COMPONENT2 OFFSET 0x200 +......

| 00 | 01 | 02 | 03 | 04 | 05 |
|----|----|----|----|----|----|
| 06 | 07 | 08 | 09 | 0A | 0B |
| 0C | 0D | 0E | 0F | 10 | 11 |
| 12 | 13 | 14 | 15 | 16 | 17 |
| 18 | 19 | 1A | 1B | 1C | 1D |
| 1E | 1F | 20 | 21 | 22 | 23 |

FIG.70

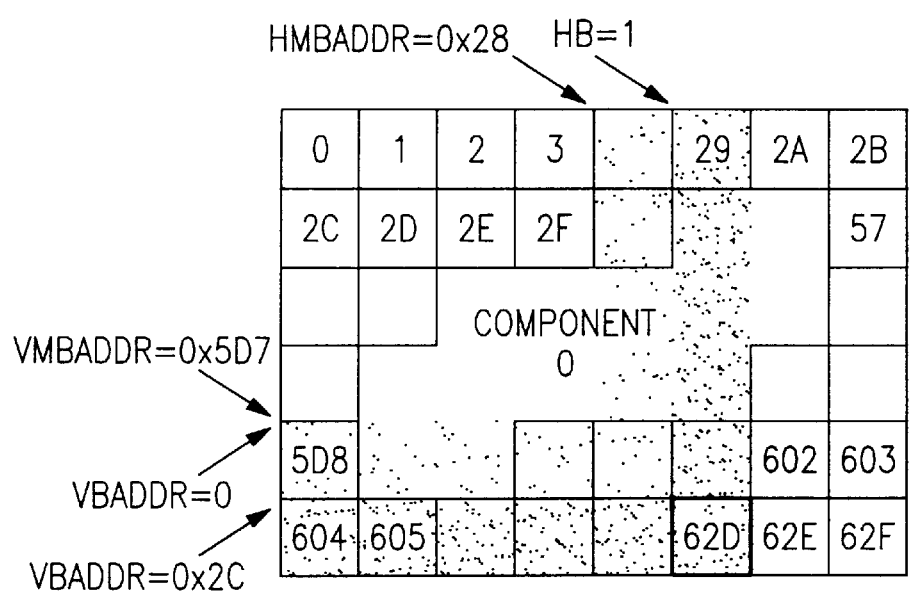
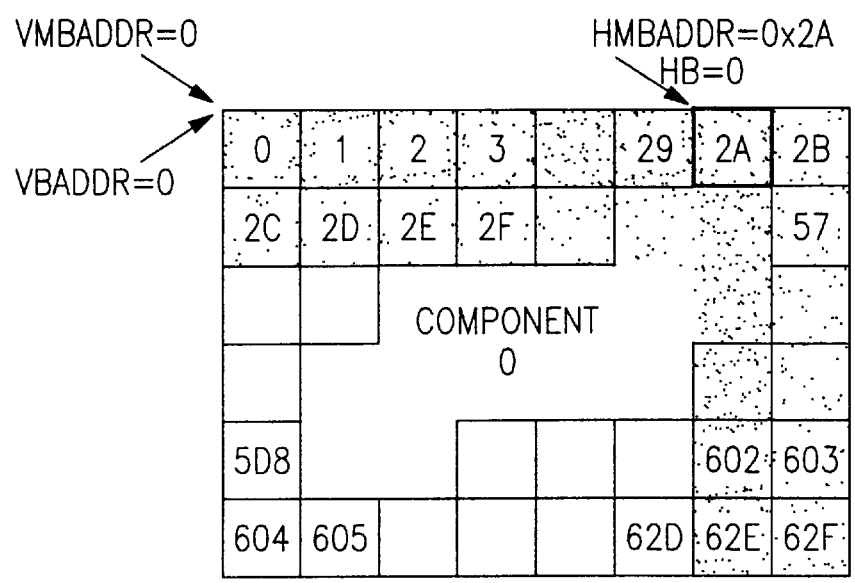
FIG. 73

METHOD AND APPARATUS FOR PROCESSING VIDEO DATA

CROSS REFERENCE TO RELATED APPLICATIONS

The Application filed herewith is a divisional of U.S. Pat. No. 5,956,741 application Ser. No. 08/950,892 filed Oct. 15, 1997, (Allowed), which is a continuation of U.S. patent application Ser. No. 08/810,780 filed Mar. 5, 1997 (Abandoned), which is a continuation of U.S. patent application Ser. No. 08/399,799 filed Mar. 7, 1995, (Abandoned).

This application is related to British Patent Application entitled "Video Decompression" as U.K. Serial No. 9405914.4 filed on Mar. 24, 1994 and British Patent Application entitled "Method and Apparatus for Interfacing with RAM" as U.K. Serial No. 9503964.0 filed on Feb. 28, 1995.

BACKGROUND OF THE INVENTION

The present invention relates to random access memory (RAM) and more particularly, to a method for interfacing with RAM.

SUMMARY OF THE INVENTION

The invention provides a RAM interface for connecting a bus to RAM comprising means for receiving from the bus and buffering a plurality of data words, means for receiving from the bus an address associated with the plurality of data words, means for generating a series of addresses in RAM into which the buffered data words will be written, the series of addresses being derived from the received address and means for writing the buffered data words into RAM at the generated address. The data word receiving and buffering means may include a swing buffer. The RAM may operate in a page addressing mode and the address generating means may include means for generating row addresses and means for generating column addresses based on the received address. The RAM may be a DRAM, the bus may include a two wire interface, the data word receiving and buffering means may include a two wire interface, the address receiving means may include a two wire interface and the plurality of data words as well as the received address may be in the form of a token. The RAM interface may further include means for determining whether the data word receiving means has received and buffered the plurality of data words.

The invention also provides a RAM interface for connecting a bus to RAM comprising a plurality of data words stored in RAM at predetermined addresses, means for receiving from the bus a RAM address associated with the plurality of data words, means for generating a series of RAM addresses for addressing the plurality of data words in RAM, the series of addresses being derived from the received address, means for buffering data words read from RAM and means for reading from RAM the plurality of data words, using the series of RAM addresses generated by the address generating means, and writing the data words into buffer means. The data word buffering means may include a swing buffer. The RAM may operate in a page addressing mode and the address generating means may include means for generating row addresses and means for generating column addresses based on the received address. The RAM may be a DRAM, the bus may include a two wire interface, the data word receiving and buffering means may include a two wire interface, the address receiving means may include a two wire interface and the plurality of data words as well as the received address may be in the form of a token. The RAM interface may further include means for determining whether the data word receiving means has received and buffered the plurality of data words.

BRIEF DESCRIPTION OF THE DRAWINGS

FIG. 9 shows the variable length of picture data used in the present invention;

FIG. 10 is a pictorial representation of the prediction filtering process;

FIG. 11 shows a generalized representation of the macroblock structure;

FIG. 12 shows a generalized block diagram of a start code detector;

FIG. 13 shows a generalized block diagram of an index-to-tokens converter;

FIG. 22 is a block diagram of the temporal decoder including the prediction filters;

FIG. 23 is a block diagram illustrating the prediction filter;

FIG. 24 is a block diagram illustrating the Huffman decoder and parser state machine of the spatial decoder;

FIG. 25 is a diagram illustrating MPEG and JPEG macroblock structures

FIG. 26 is a diagram illustrating tokens on interfaces wider than 8 bits;

FIG. 27 is a diagram illustrating data propagation in a decoder;

FIG. 38 is a diagram illustrating an MPEG picture sequence;

FIG. 39 is a diagram illustrating an arrangement of a group of blocks according to the H.261 standard;

FIG. 40 is a diagram illustrating an arrangement of macroblocks according to the H.261 standard;

FIG. 41 is a diagram illustrating an example of an "open GOP;"

FIG. 70 illustrates storage block addresses in an exemplary picture format;

FIG. 73 shows exemplary address calculations;

Figure 1:
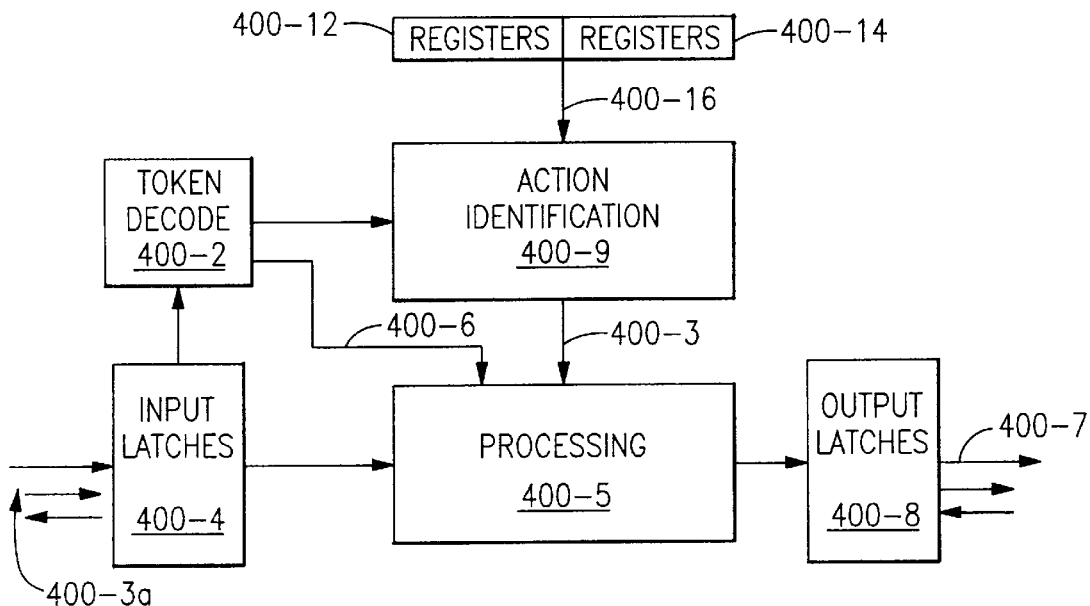
FIG. 1 is a block diagram of a reconfigurable processing stage.
Figure 3:
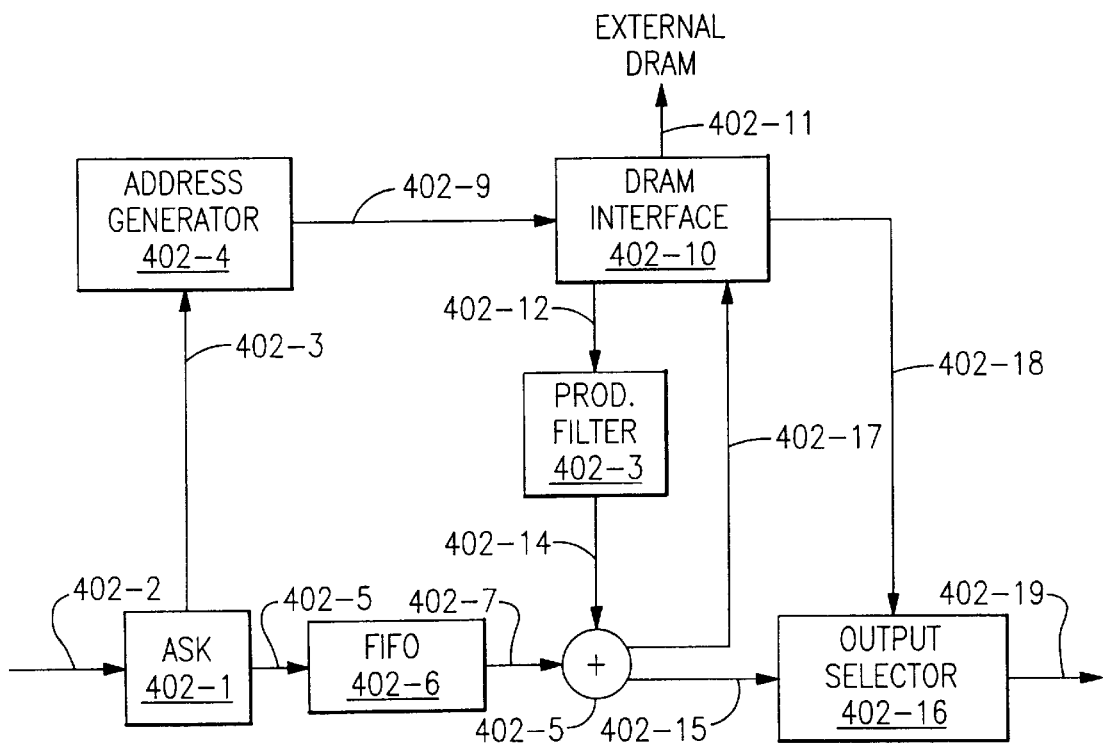
FIG. 3 is a block diagram of a temporal decoder.
Figures 2, 4:
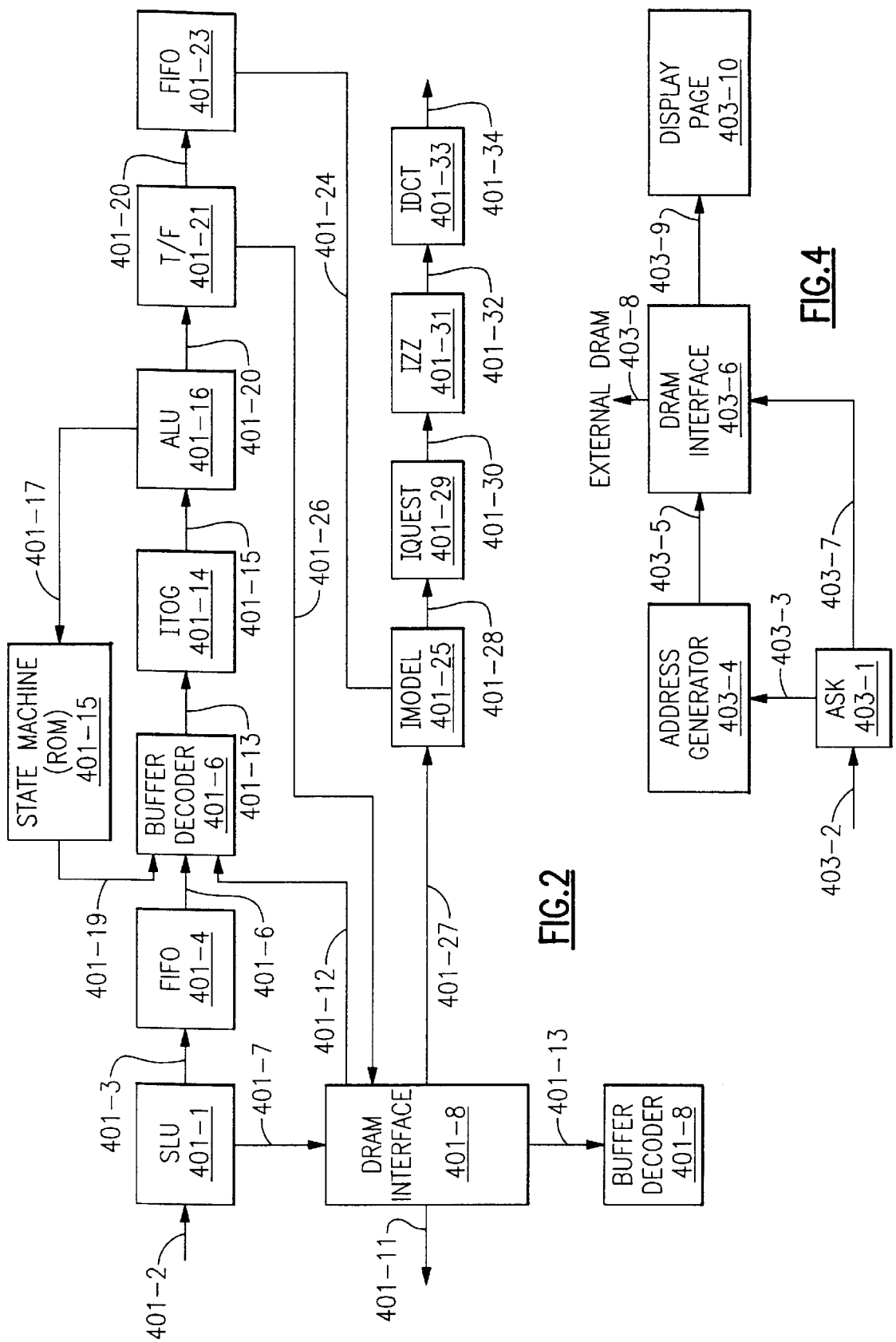
FIG. 2 is a block diagram of a spatial decoder.
FIG. 4 is a block diagram of a video formatter.
Figure 5:
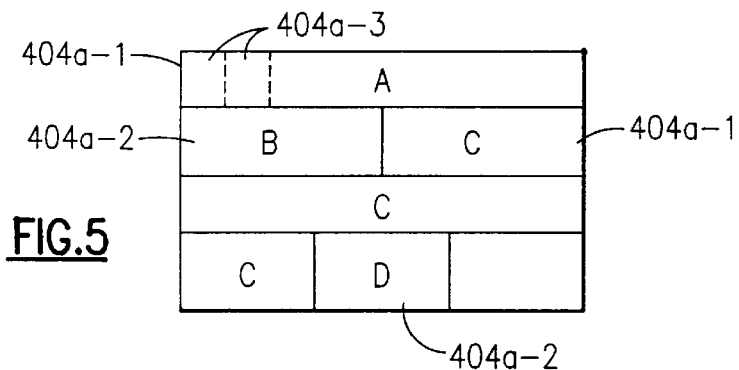
FIG. 5 is a memory map showing a first arrangement of macroblocks.
Figure 6:
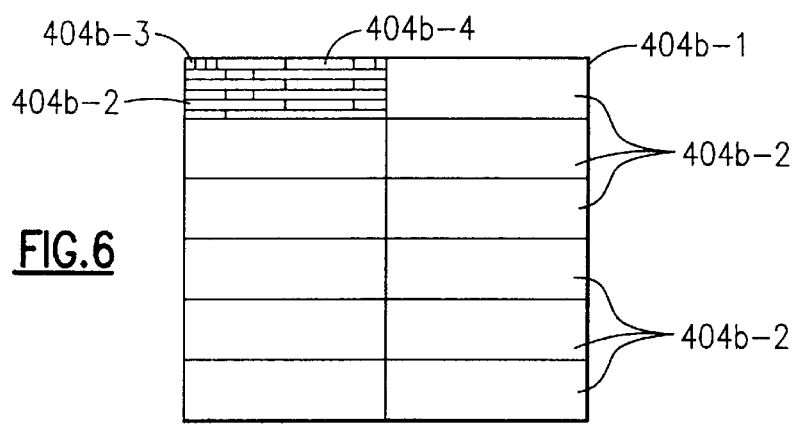
FIG. 6 is a memory map showing a second arrangement of macroblocks.
Figure 7:
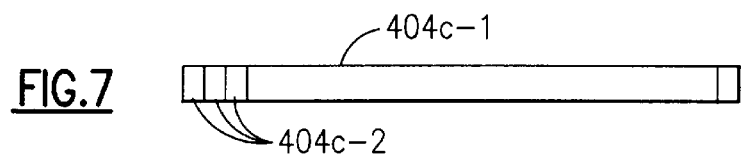
FIG. 7 is a memory map showing a further arrangement of macroblocks.
Figure 8:
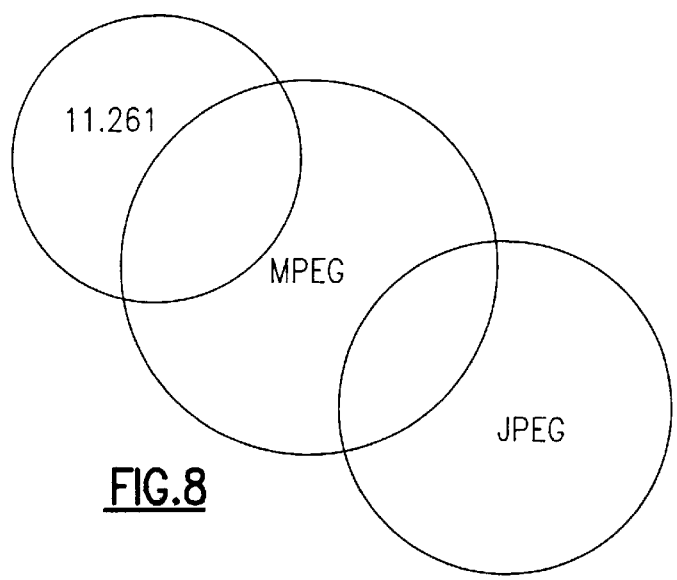
FIG. 8 shows a Venn diagram of possible table selection values.
Figure 14:
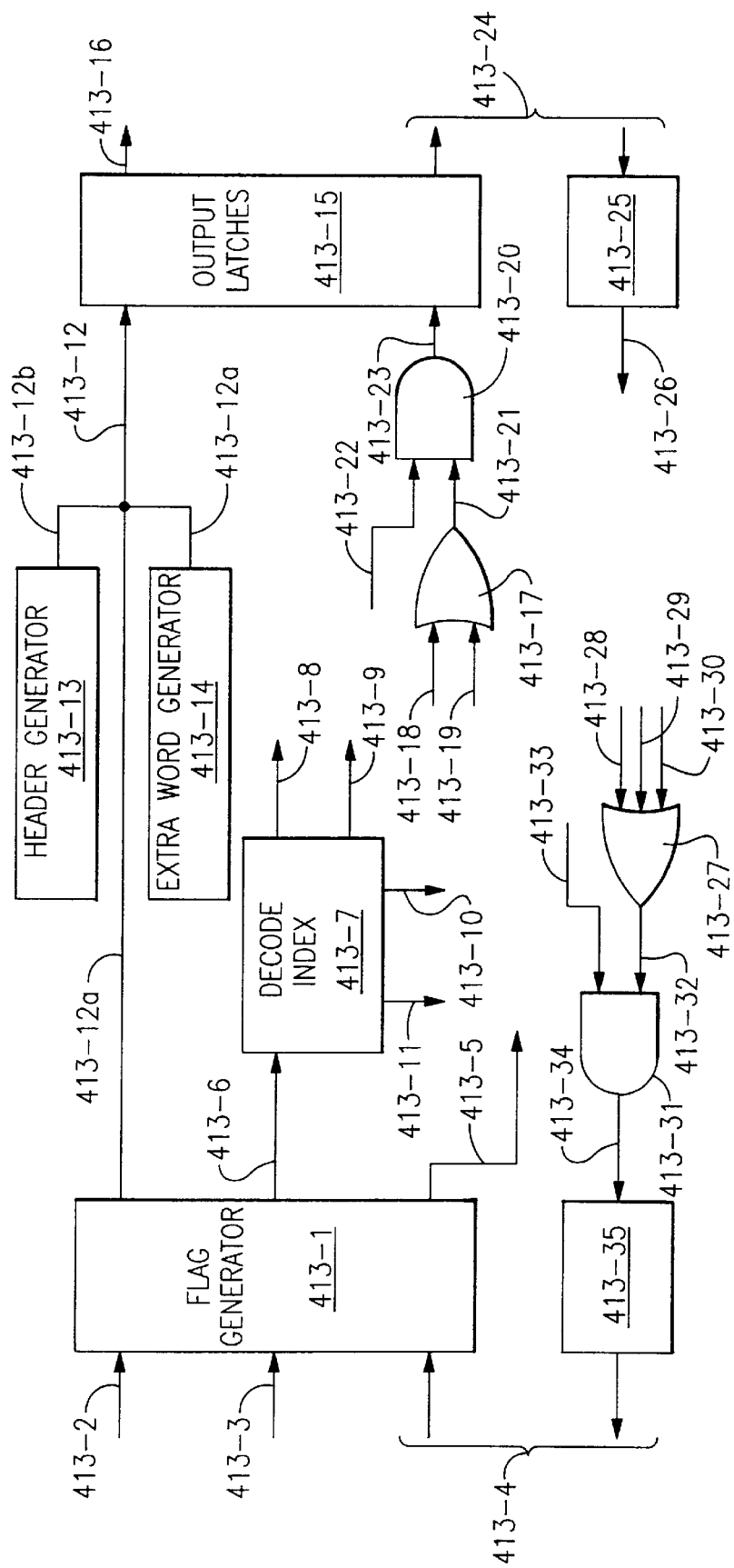
FIG. 14 is a block diagram depicting the relationship between the flag generator, decode index, header generator, extra word generator and output latches.
Figure 15:
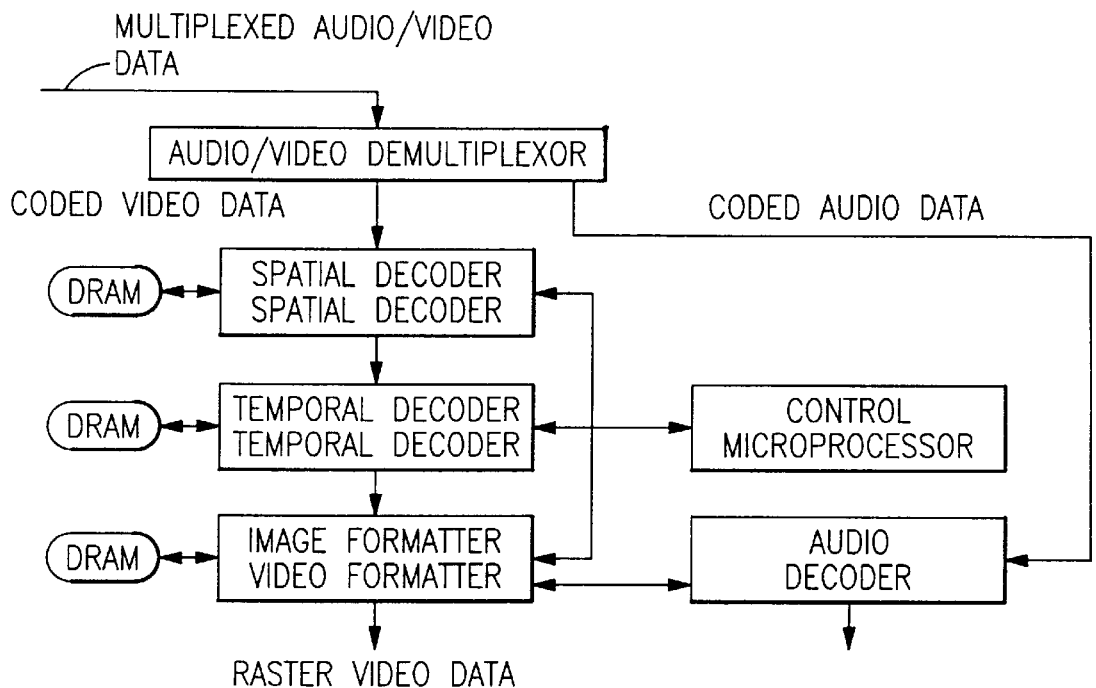
FIG. 15 shows a decoder system.
Figure 16:
FIG. 16 shows a JPEG still picture decoder.
Figure 17:
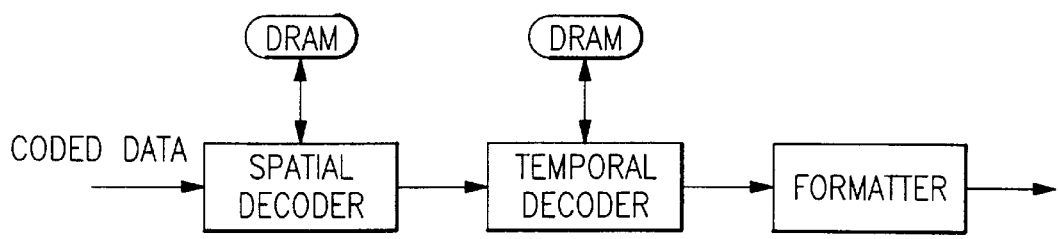
FIG. 17 shows a mult-standard video decoder.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DETAILED DESCRIPTION OF THE INVENTION

Figure 67:
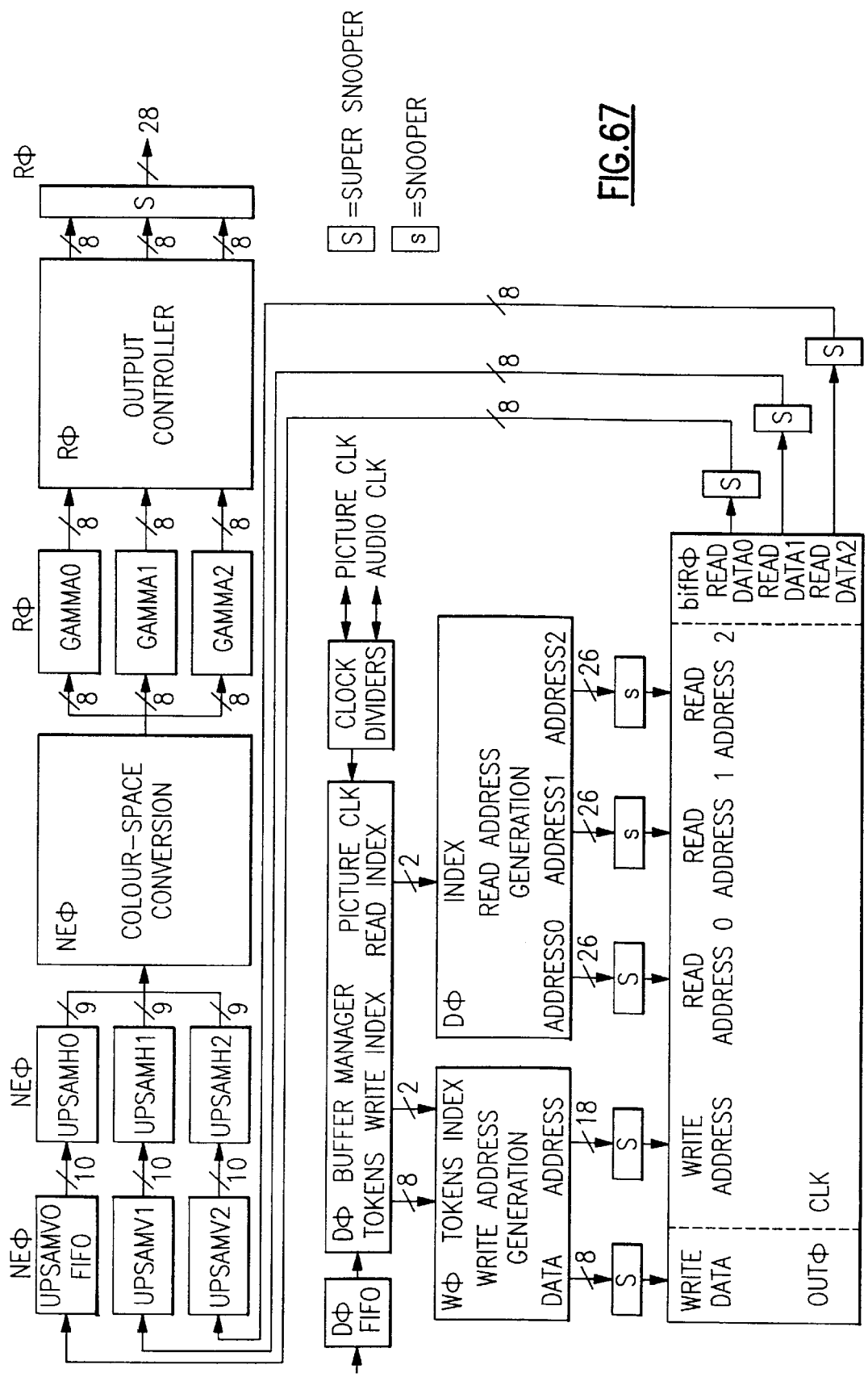
FIG. 67 is a detailed block diagram of a DRAM interface.
Figure 68:
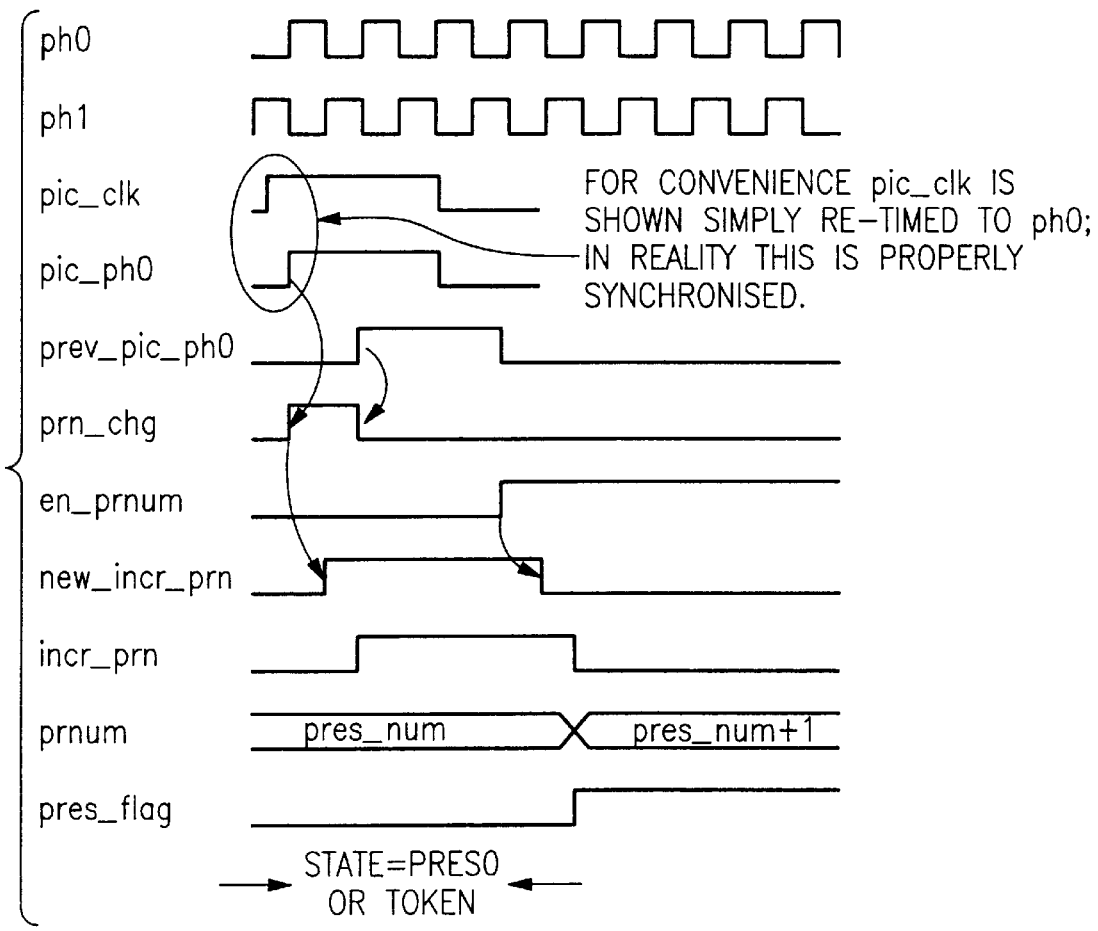
FIG. 68 is a timing diagram of the control for incrementing a presentation number.
Figure 69:
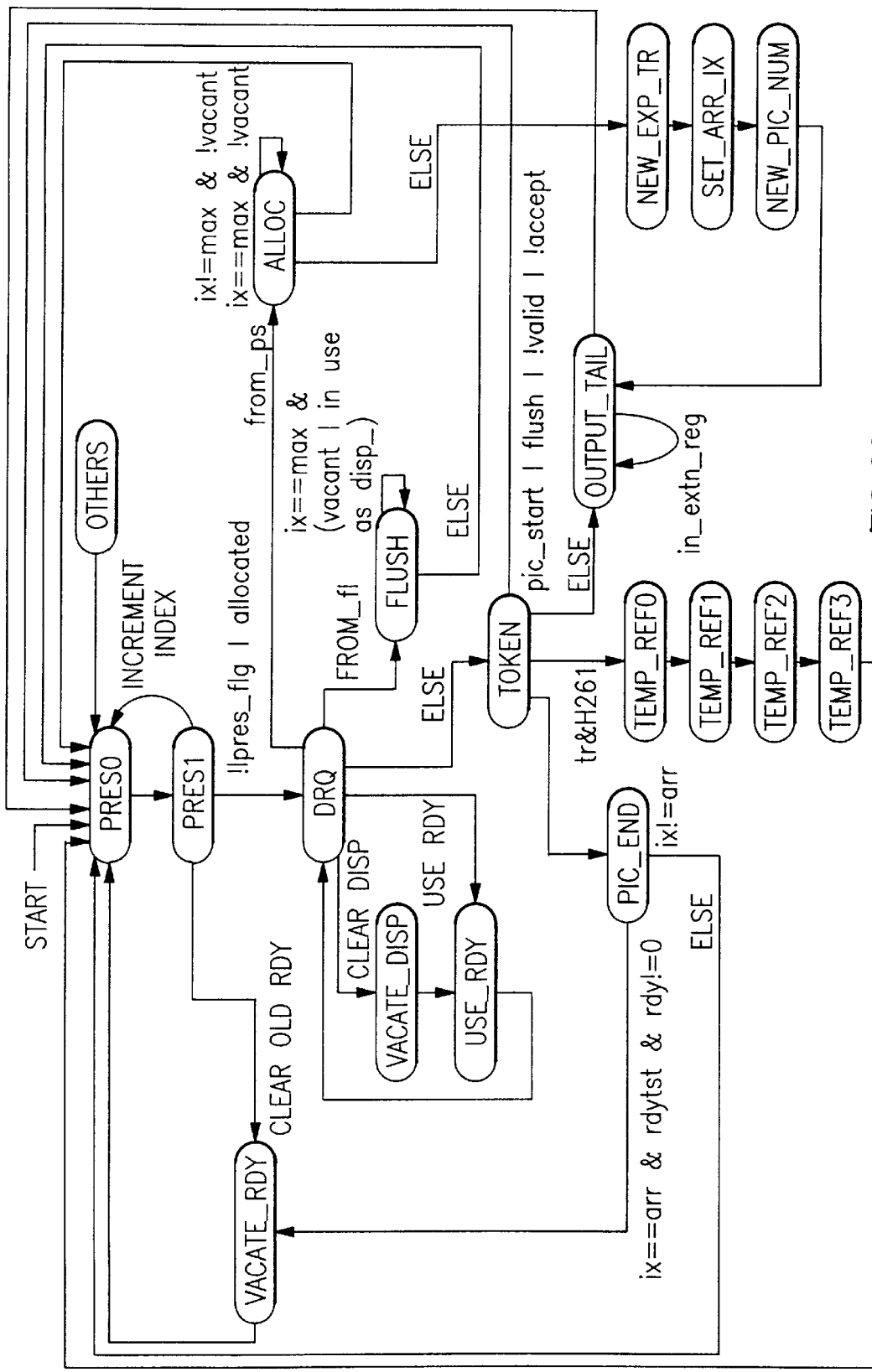
FIG. 69 is a state diagram of a buffer manager.
Figure 71:
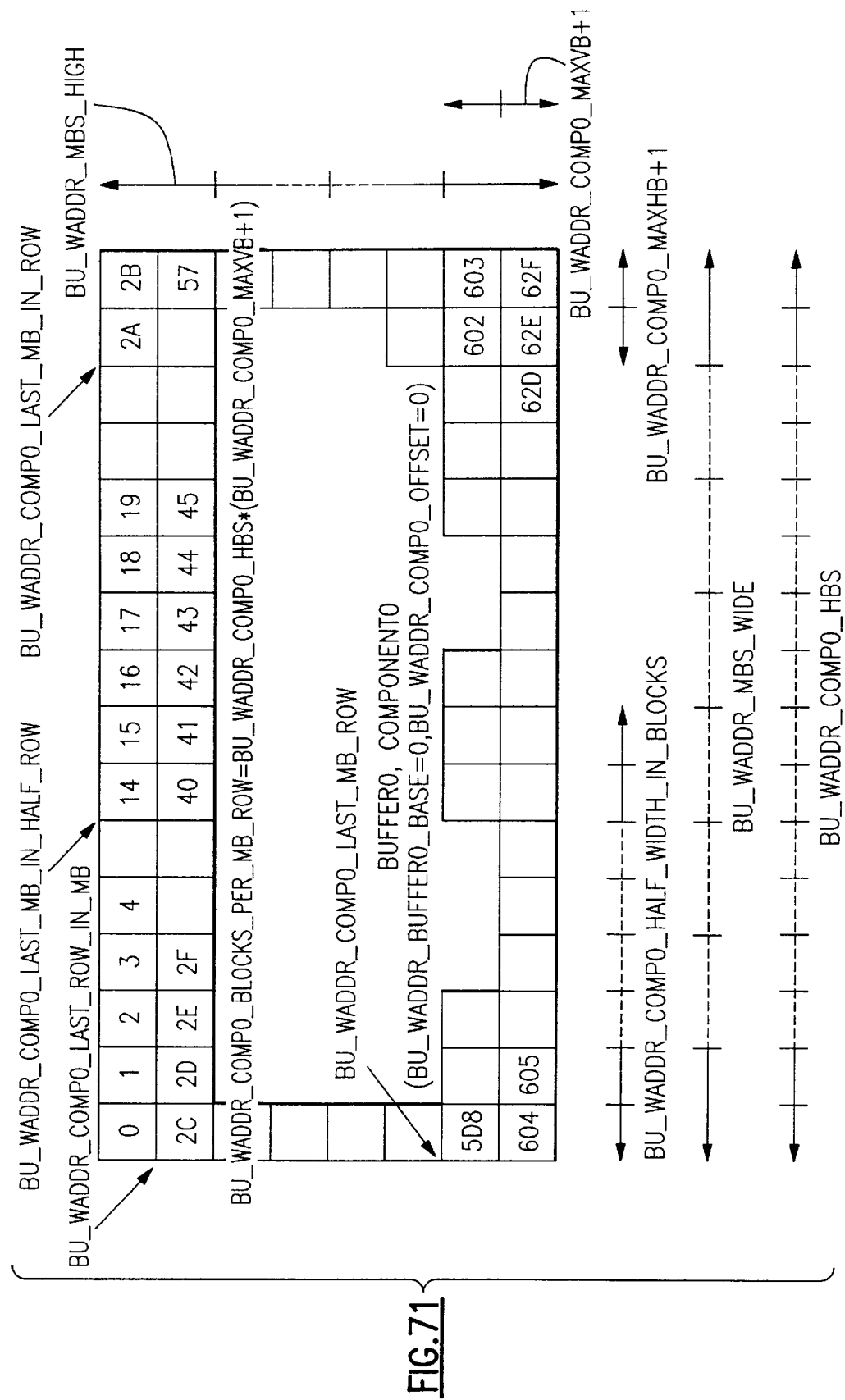
FIG. 71 illustrates a buffer containing a 22 by 18 macroblock SIF picture.
Figure 72:
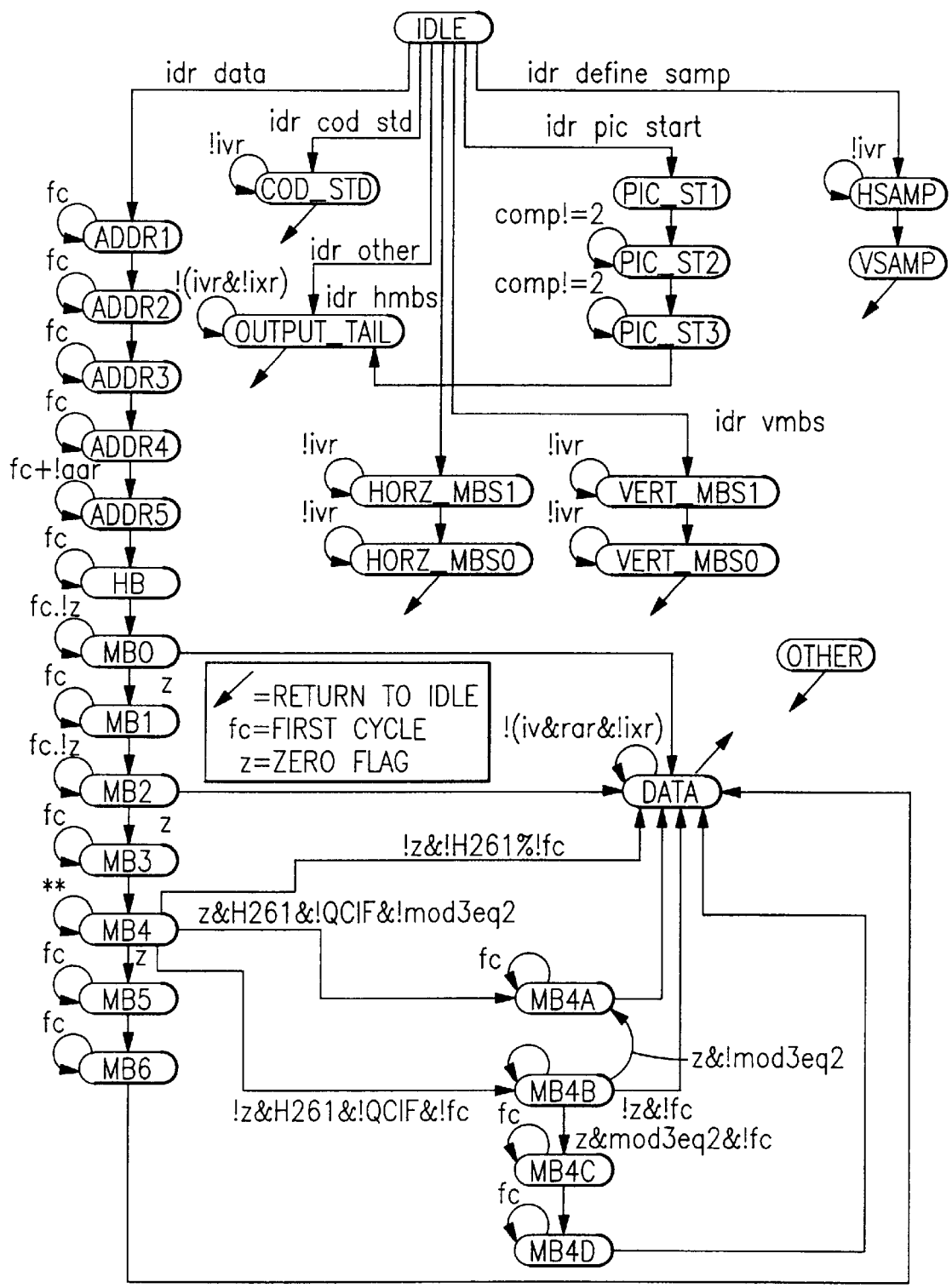
FIG. 72 is a state diagram showing write address generation.
Figure 74:
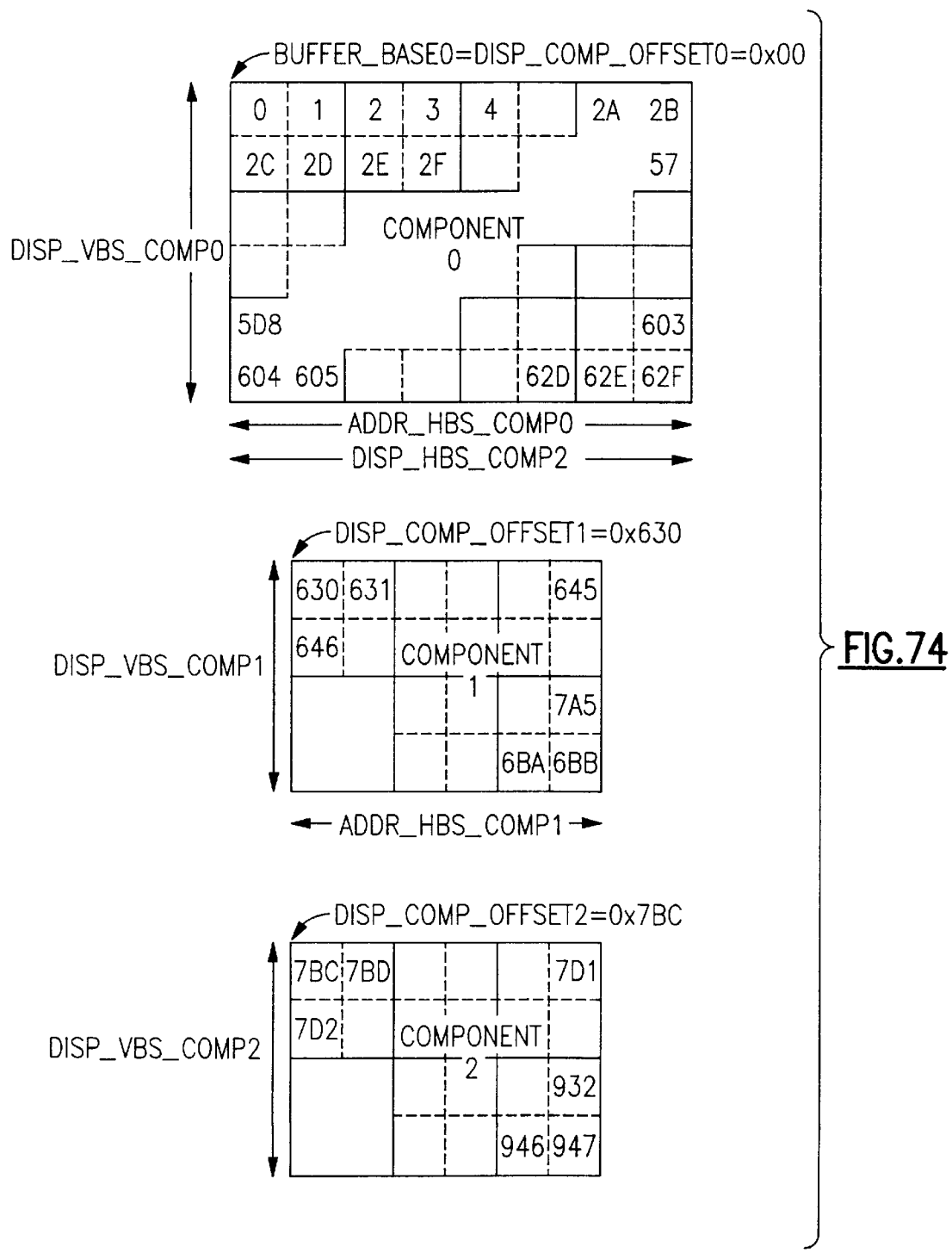
FIG. 74 is diagram of a buffer which contains a 22 by 18 macroblock SIF picture.
Figure 75:
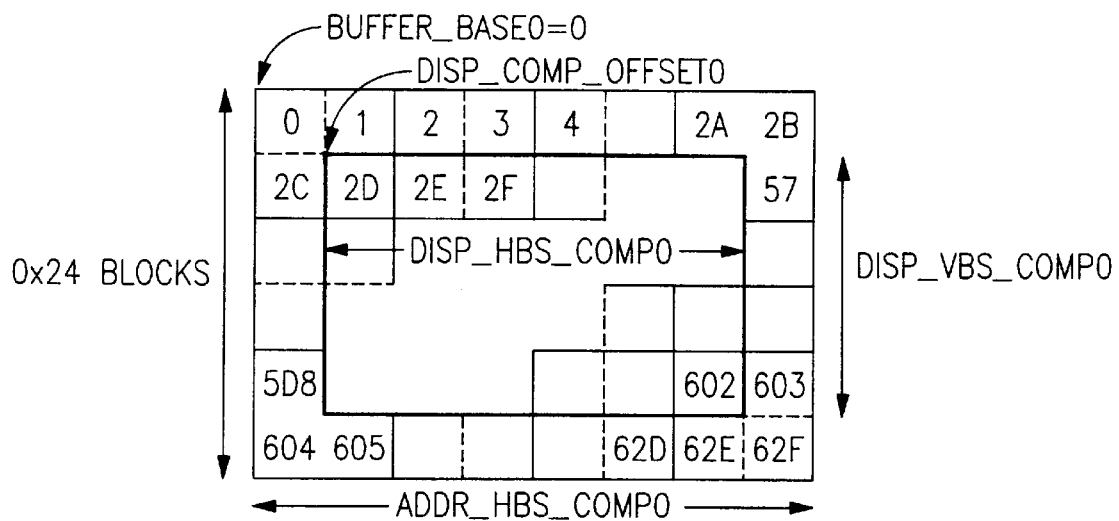
FIG. 75 illustrates a display window in a buffer which contains a 22 by 18 macroblock SIF picture.
Figure 77:
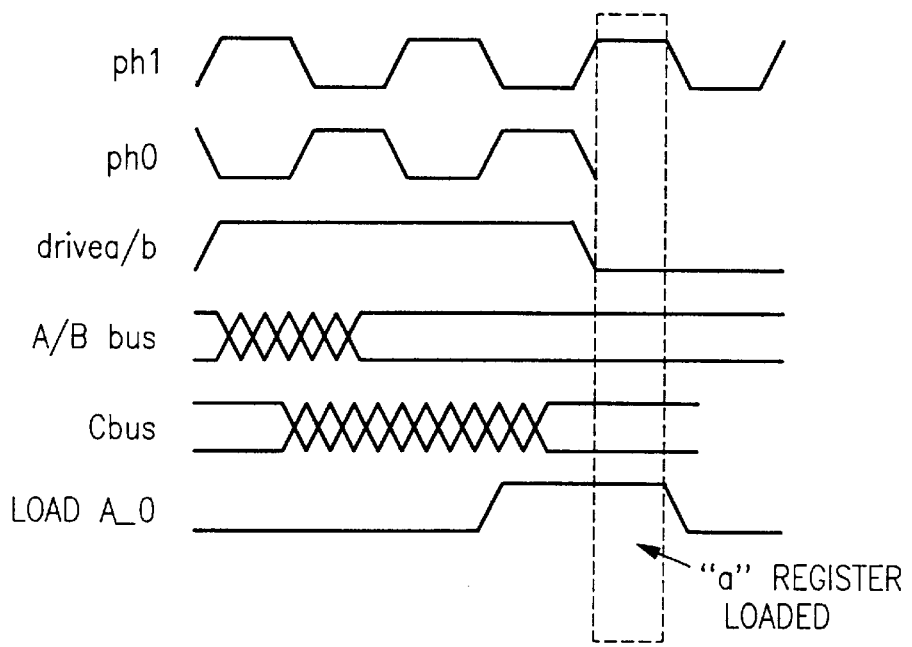
FIG. 77 is a timing diagram illustrating a two cycle operation on the data path shown in FIG. 76.
Figure 76:
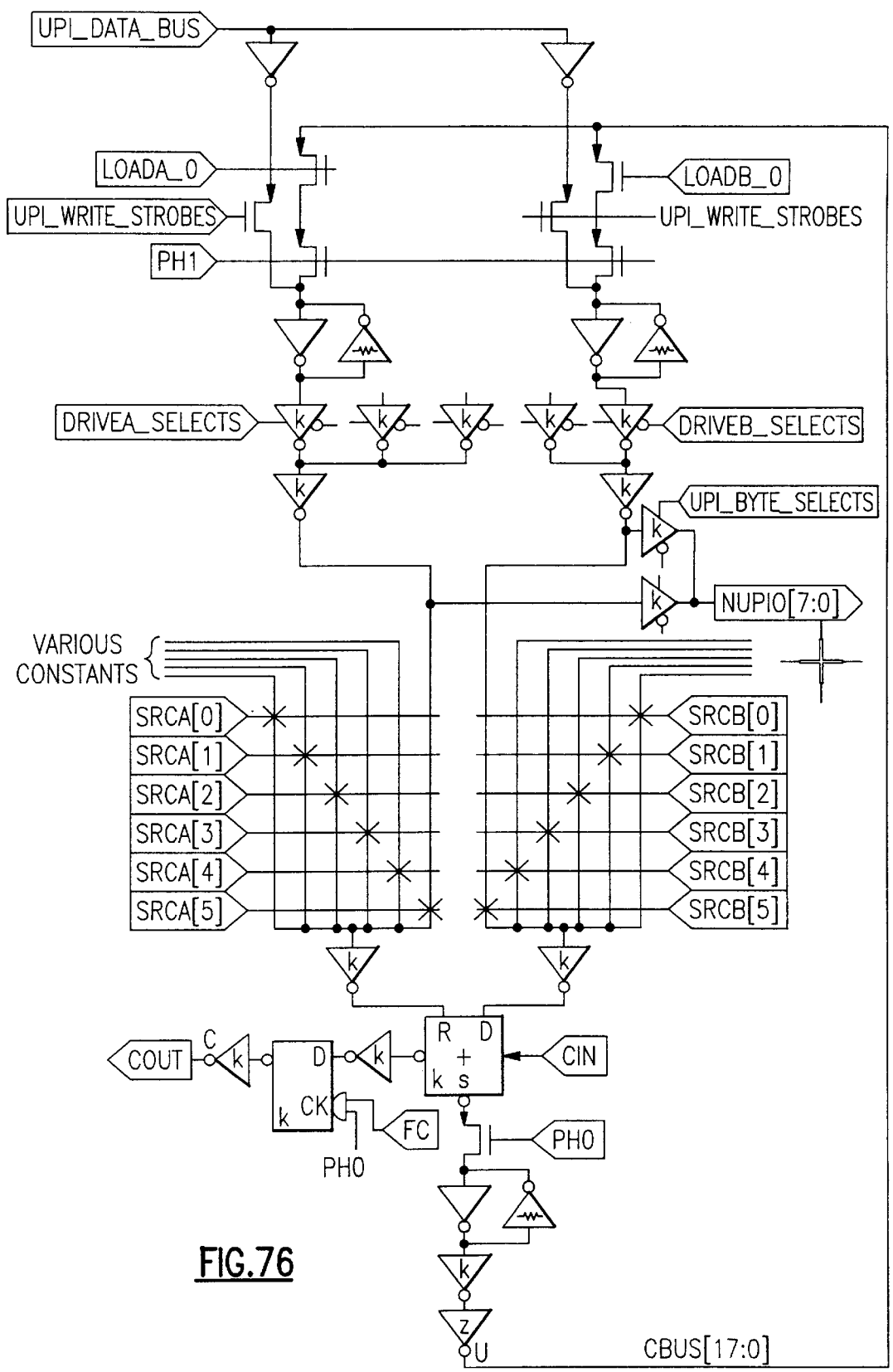
FIG. 76 is a diagram illustrating a slice of a data path.
Figure 78:
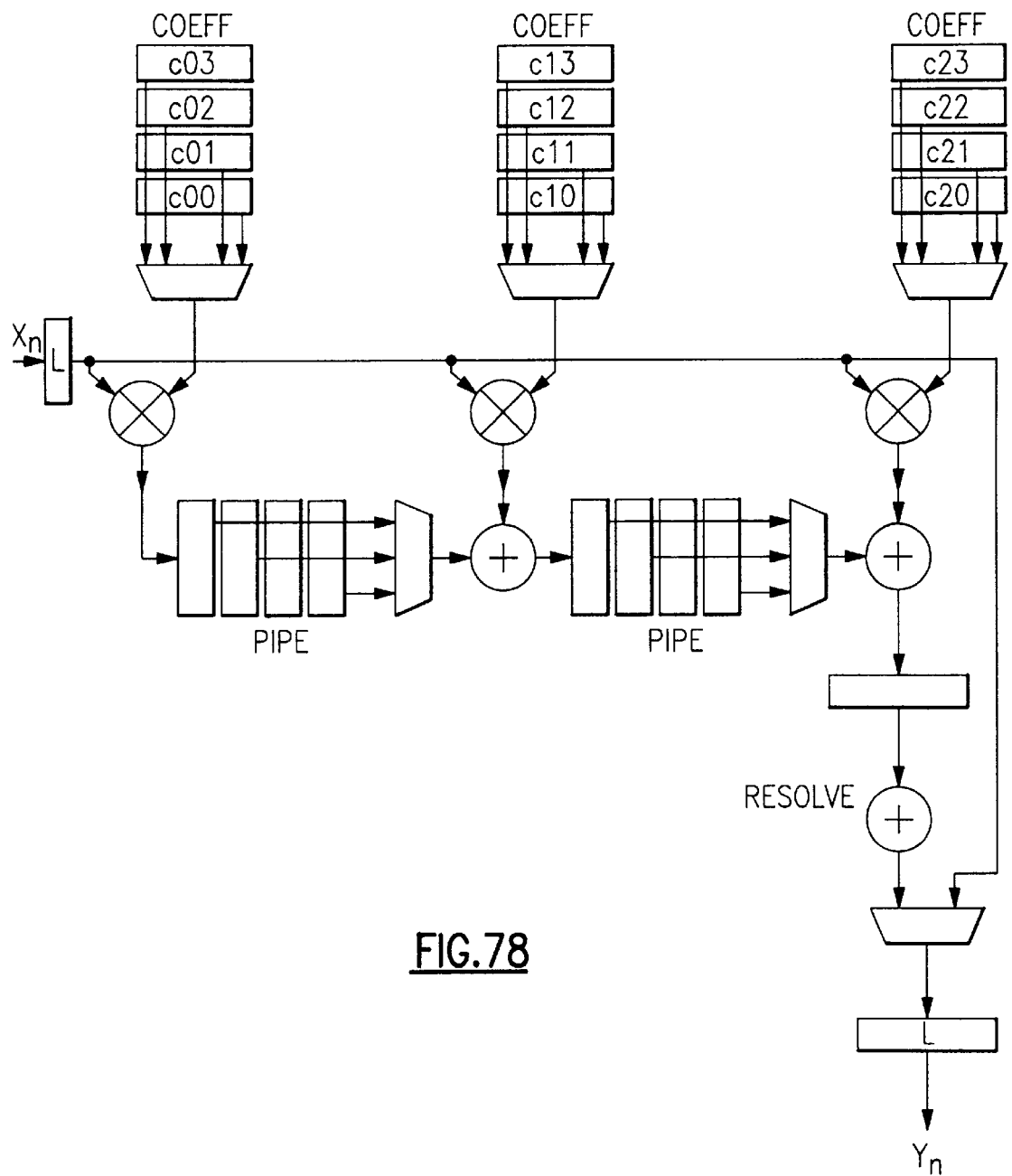
FIG. 78 illustrates a horizontal up-sampler data path.
Figure 79:
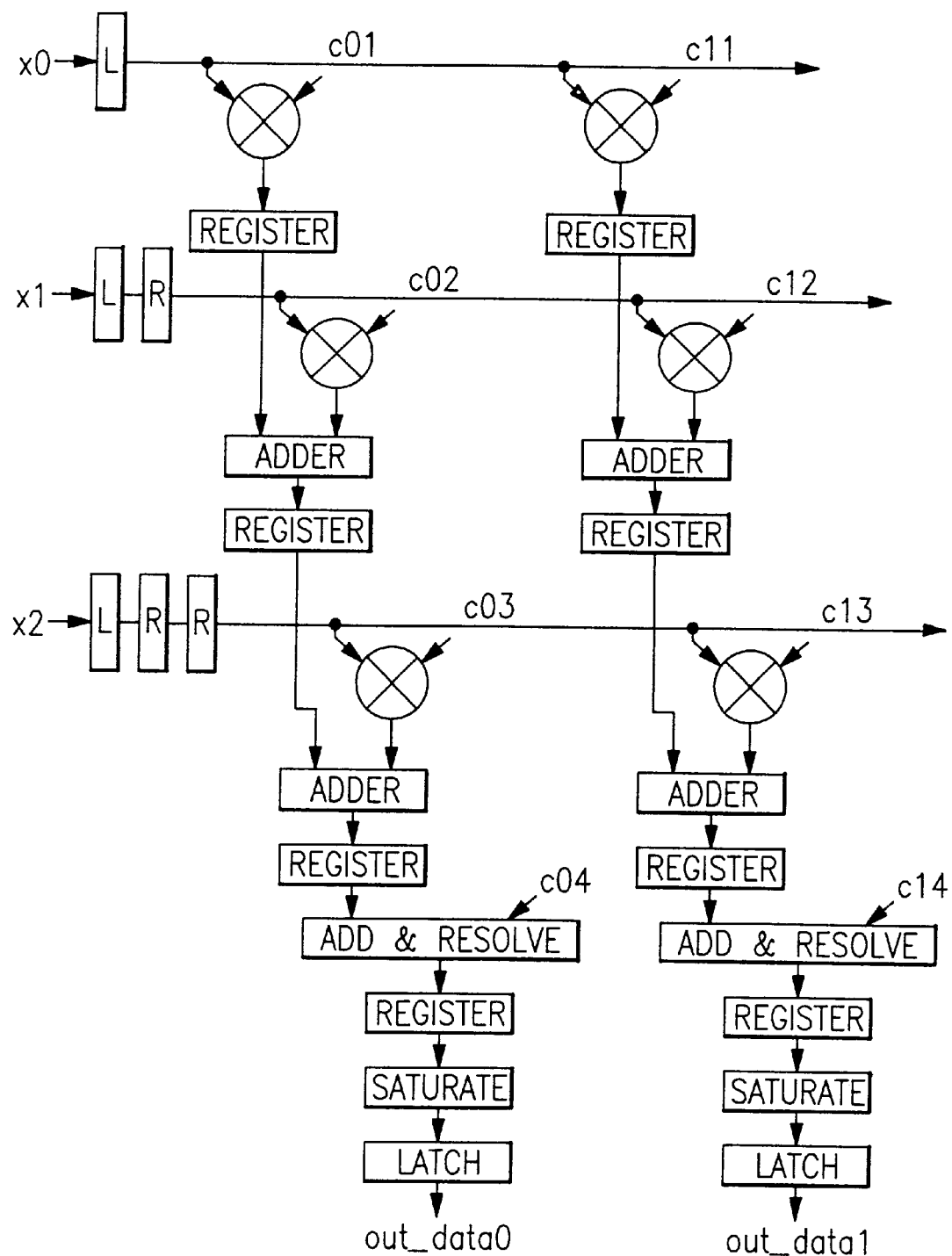
FIG. 79 is a block diagram of a color space converter.
Figure 80:
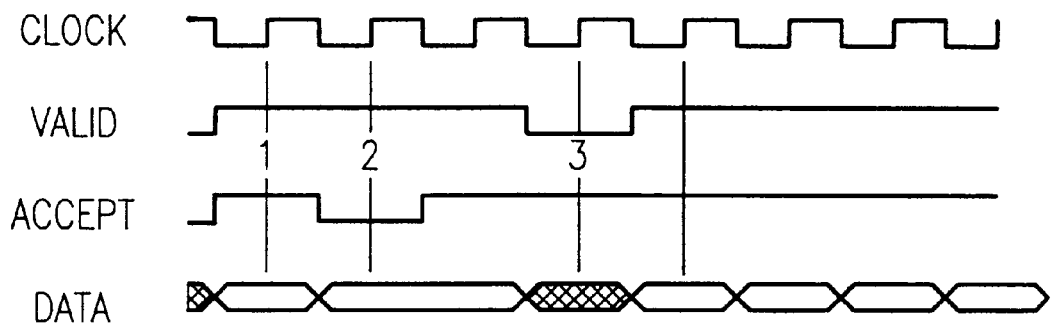
FIG. 80 is a timing diagram of the two wire interface shown in FIG. 59.
Figure 81:
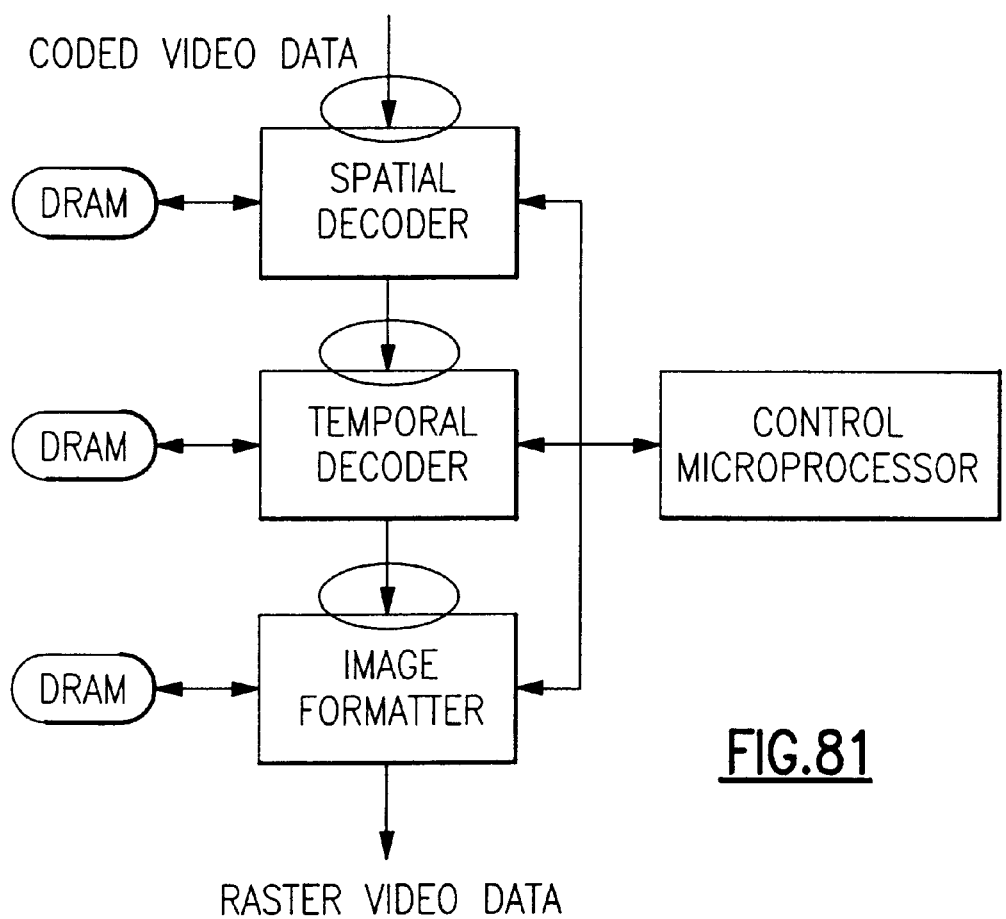
FIG. 81 shows the location of external two-wire interfaces.

A single high performance, configurable DRAM interface 100 is illustrated in FIG. 67. This interface is a standard-independentblock and is designed to directly drive the DRAMs required, for example, by a spatial decoder, a temporal decoder and a video formatter. No external logic, buffers or components will be required to connect the DRAM interface to DRAM in those systems.

The interface is configurable in two ways. First, the detailed timing of the interface can be configured to accommodate a variety of different DRAM types. Second, the width of the data interface to the DRAM can be configured to provide a cost/performance trade-off for different applications.

On each chip the DRAM interface connects the chip to external DRAM. External DRAM is used, because at present, it is not practical to fabricate on the chips the relatively large amount of DRAM needed. However, it is possible to fabricate on the chips the large amount of DRAM that is needed.

Although the DRAM interface is standard-independent, it still must be configured to implement each of the multiple standards, H.261, JPEG and MPEG. How the DRAM interface is reconfigured for multi-standard operation is discussed further herein.

An important aspect in understanding the operation of the DRAM interface 100 is to understand the relationship between the DRAM interface 100 and the address generator 110, and how the two communicate using the two wire interface. There are two address generators, one for writing 120 and one for reading 130. A buffer manager 140 supervises the two address generators 120 and 130. This buffer manager 140 is described in greater detail in the application entitled "Buffer Manager", Ser. No. 08/399,801 filed Mar. 7, 1995.

In brief, as its name implies, the address generator generates the addresses the DRAM interface needs to address the DRAM (e.g., to read from or to write to a particular address in DRAM). With a two-wire interface, reading and writing only occurs when the DRAM interface has both data (from preceding stages in the pipeline), and a valid address (from address generator). The use of a separate address generator simplifies the construction of both the address generator and the DRAM interface, as discussed further below.

The DRAM interface can operate from a clock which is asynchronous to both the address generator and to the clocks of the blocks which data is passed from and to. Special techniques have been used to handle this asynchronous nature of the operation.

Data is usually transferred between the DRAM interface and the rest of the chip in blocks of 64 bytes. Transfers take place by means of a device known as a "swing buffer". This is essentially a pair of RAMs operated in a double-buffered configuration, with the DRAM interface filling or emptying one RAM while another part of the chip empties or fills the other RAM. A separate bus which carries an address from an address generator is associated with each swing buffer.

Each of the chips has four swing buffers, but the function of these swing buffers is different in each case. In the spatial decoder, one swing buffer is used to transfer coded data to the DRAM, another to read coded data from the DRAM, the third to transfer tokenized data to the DRAM and the fourth to read tokenized data from the DRAM. In the temporal decoder, one swing buffer is used to write intra or predicted picture data to the DRAM, the second to read intra or predicted data from the DRAM and the other two to read forward and backward prediction data. In the video formatter, one swing buffer issued to transfer data to the DRAM and the other three are used to read data from the DRAM, one for each of the luminance (Y) and the red and blue color difference data (Cr and Cb).

Figure 18:
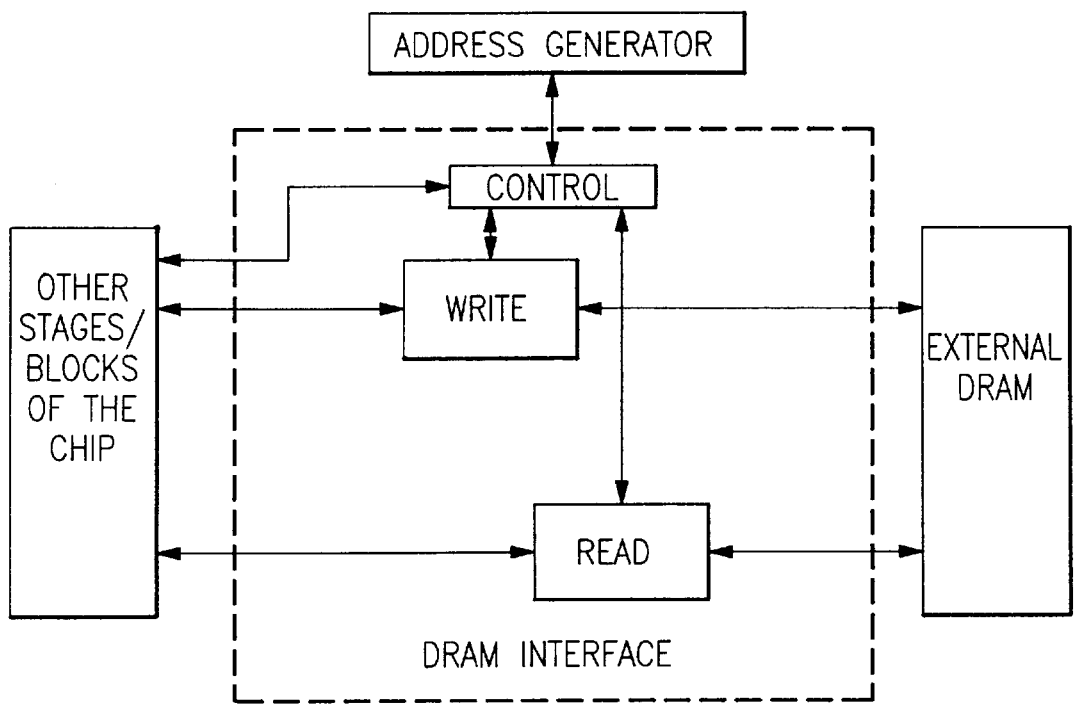
FIG. 18 is a block diagram of the decoder DRAM interface.
Figure 19:
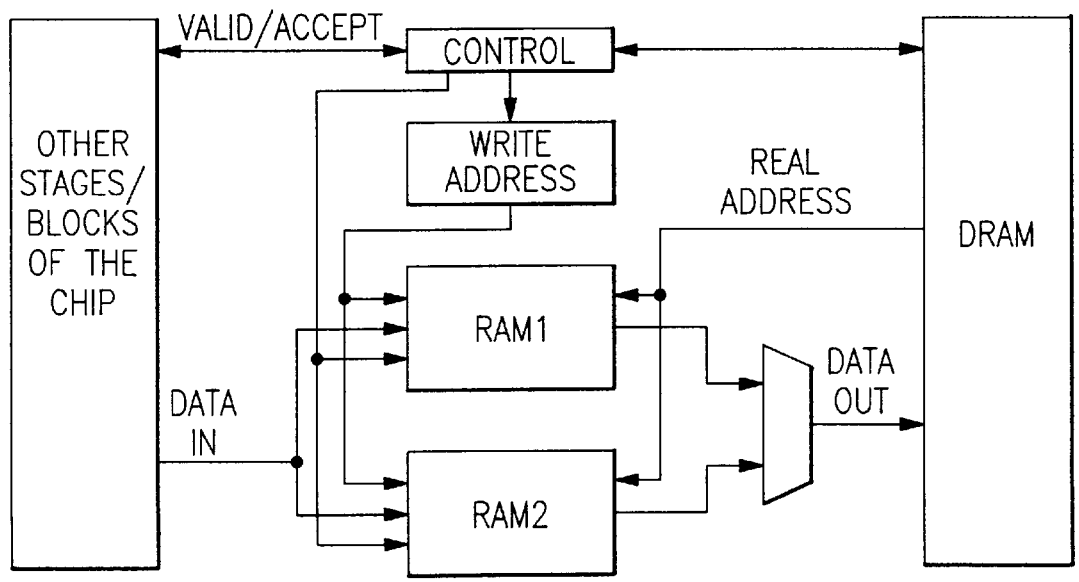
FIG. 19 is a block of a write swing buffer.
Figure 20:
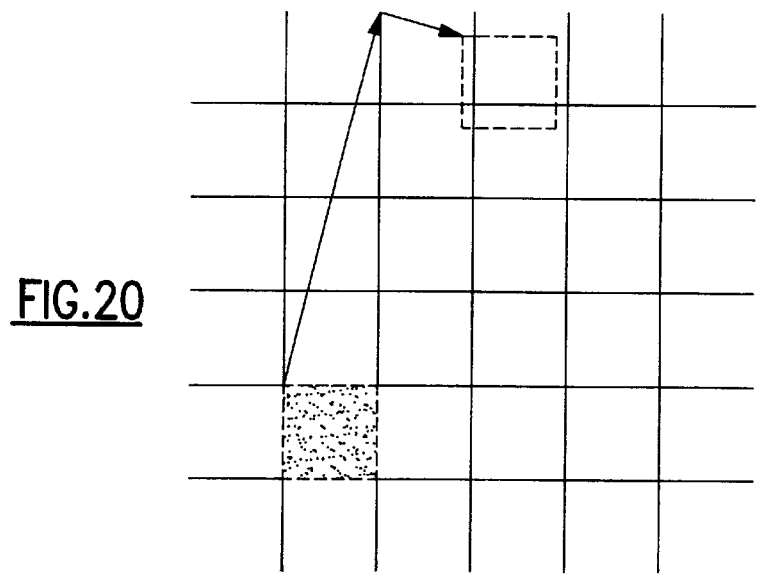
FIG. 20 is a pictorial diagram illustrating prediction data offset from the block being processed.
Figure 21:
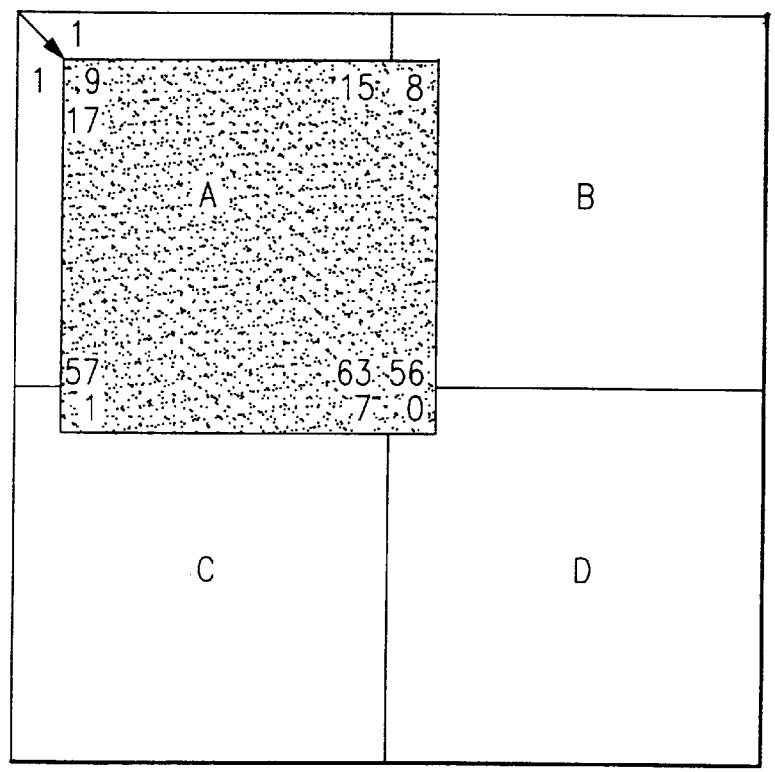
FIG. 21 is a pictorial diagram illustrating prediction data offset by (1,1)
Figures 28, 29:
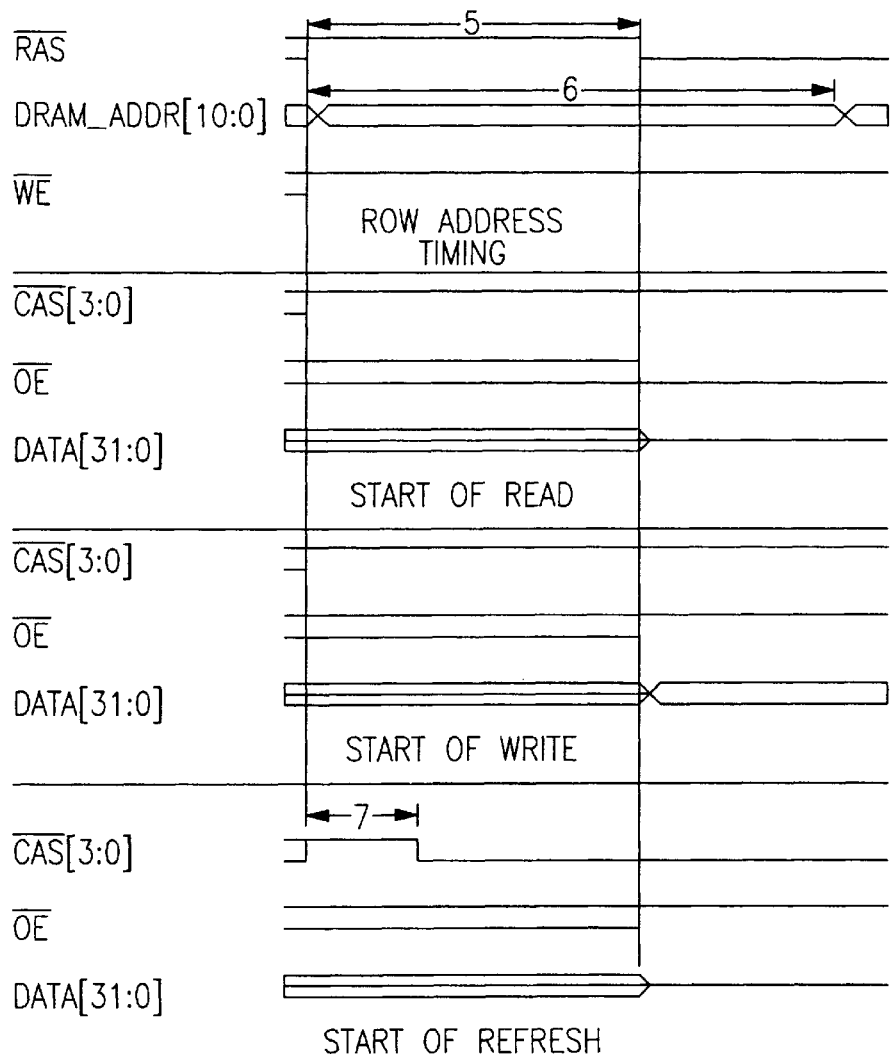
FIG. 28 is a timing diagram illustrating access start timing.
FIG. 29 is a diagram illustrating organization of large integers in a memory map.
Figure 30:
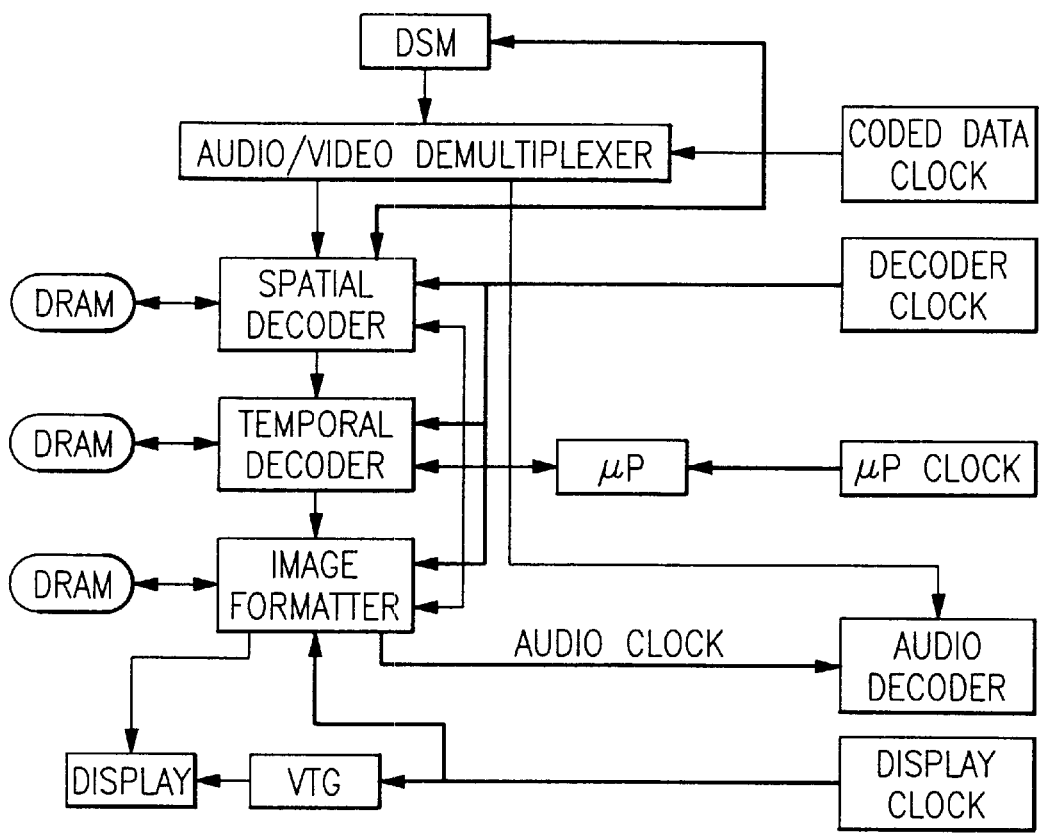
FIG. 30 is a block diagram illustrating clock regimes in a decoder.
Figure 31:
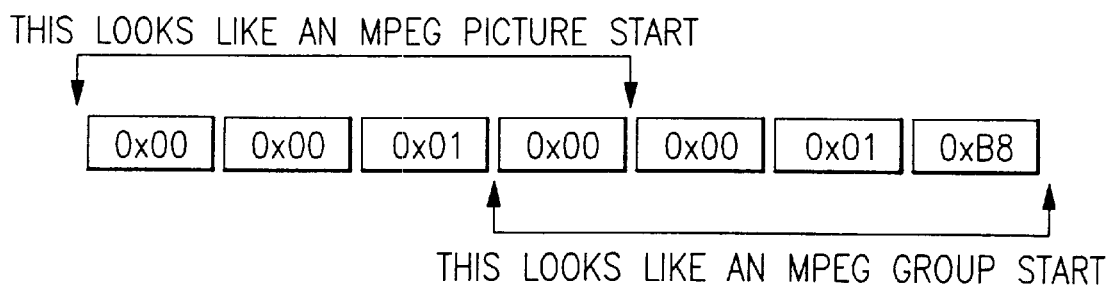
FIG. 31 is a diagram illustrating overlapping MPEG start codes.
Figure 32:
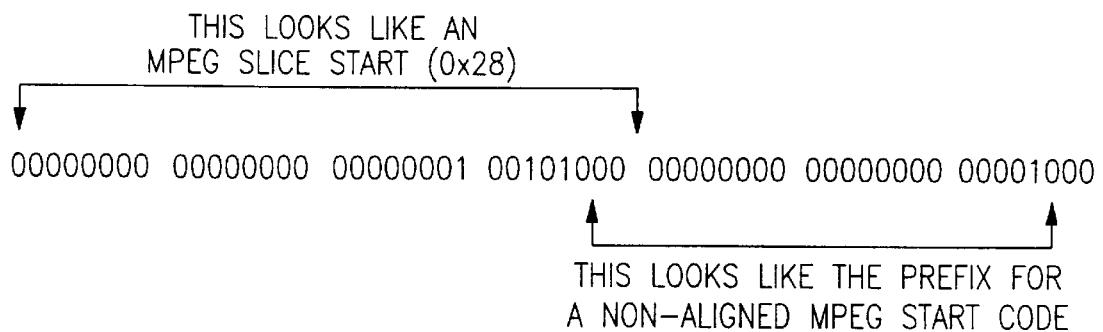
FIG. 32 is a diagram illustrating overlapping MPEG start codes.
Figure 33:
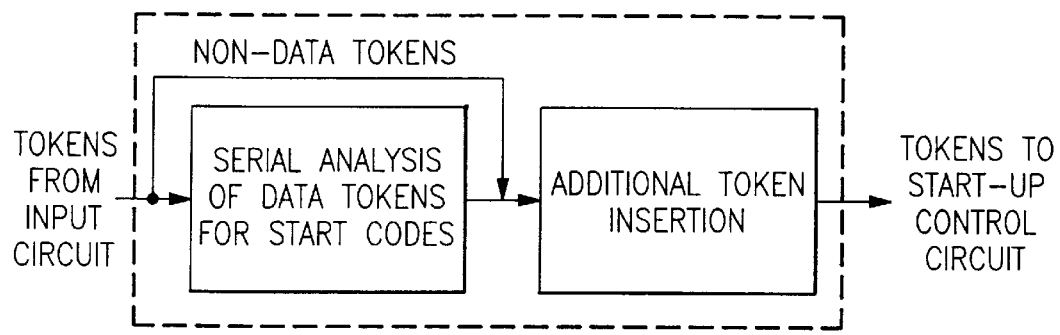
FIG. 33 is a diagram illustrating a start code detector.
Figure 34:
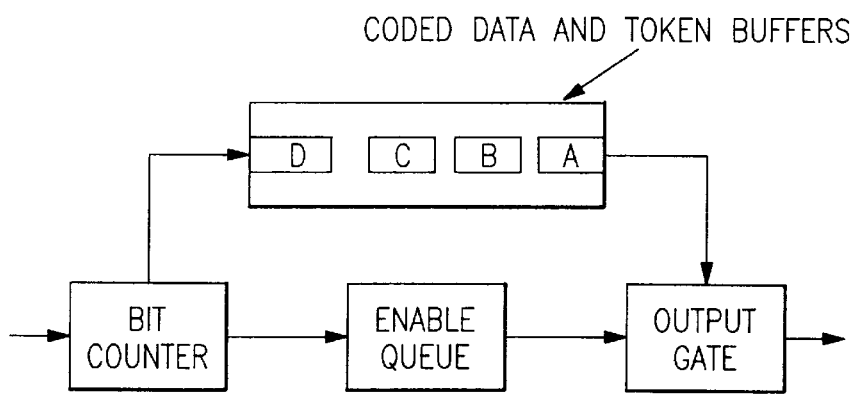
FIG. 34 is a diagram illustrating queuing of enabled data streams prior to output thereof.
Figure 35:
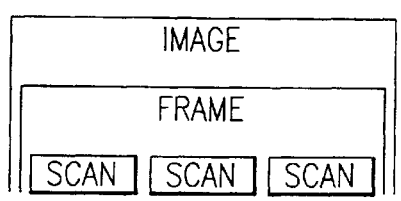
FIG. 35 is a diagram illustrating an overview of the JPEG baseline sequential structure.
Figure 36:
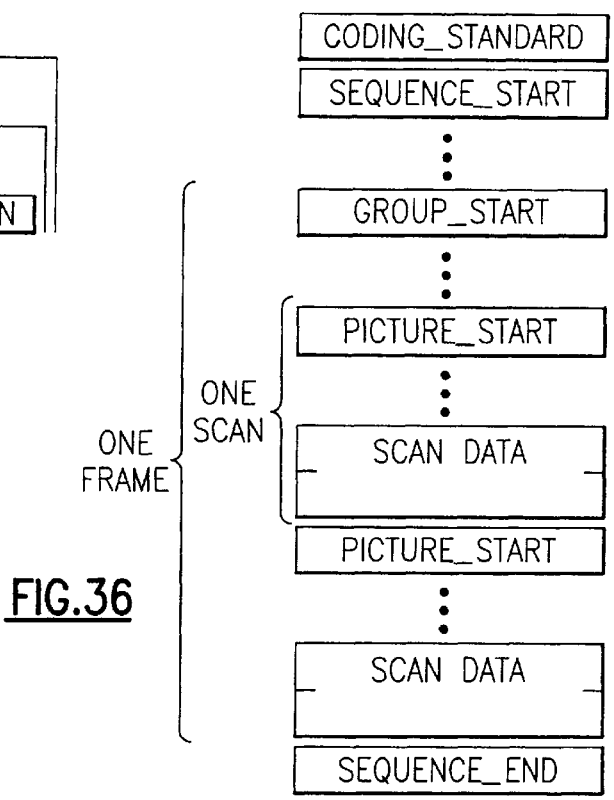
FIG. 36 is a diagram illustrating a tokenized JPEG picture.
Figure 37:
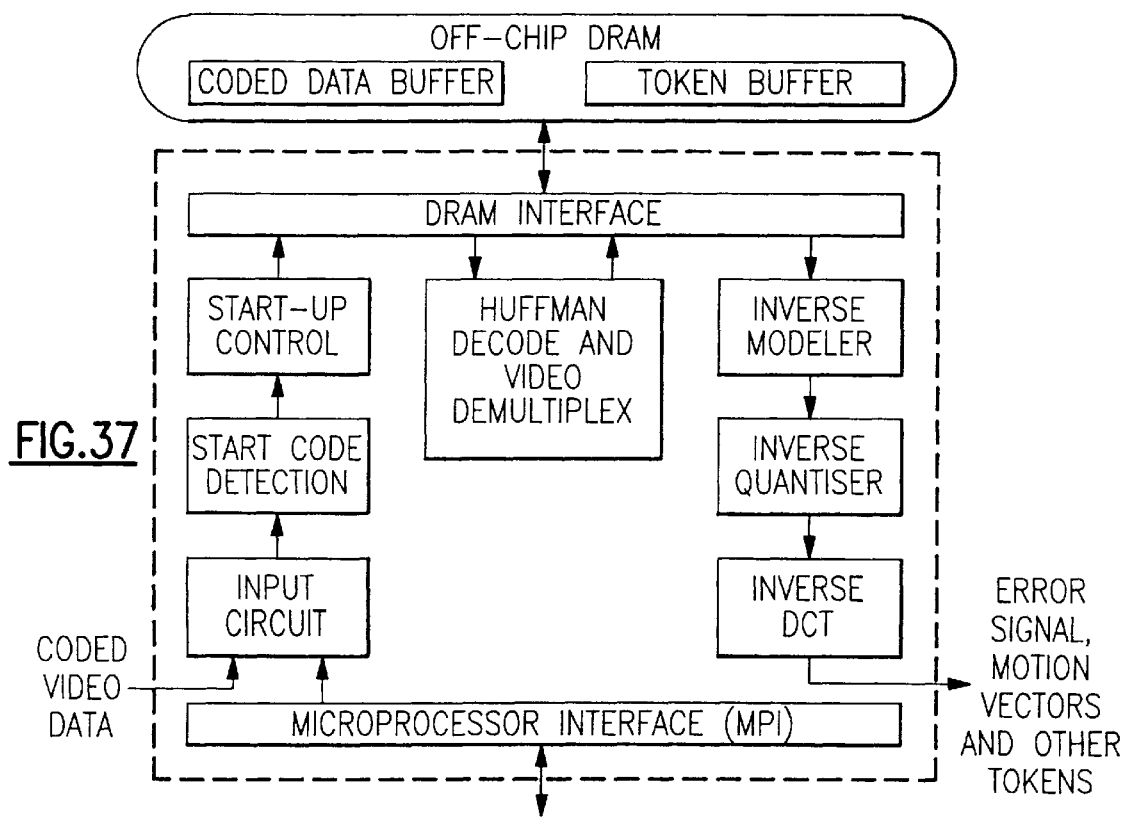
FIG. 37 is a block diagram of a spatial decoder.
Figure 42:
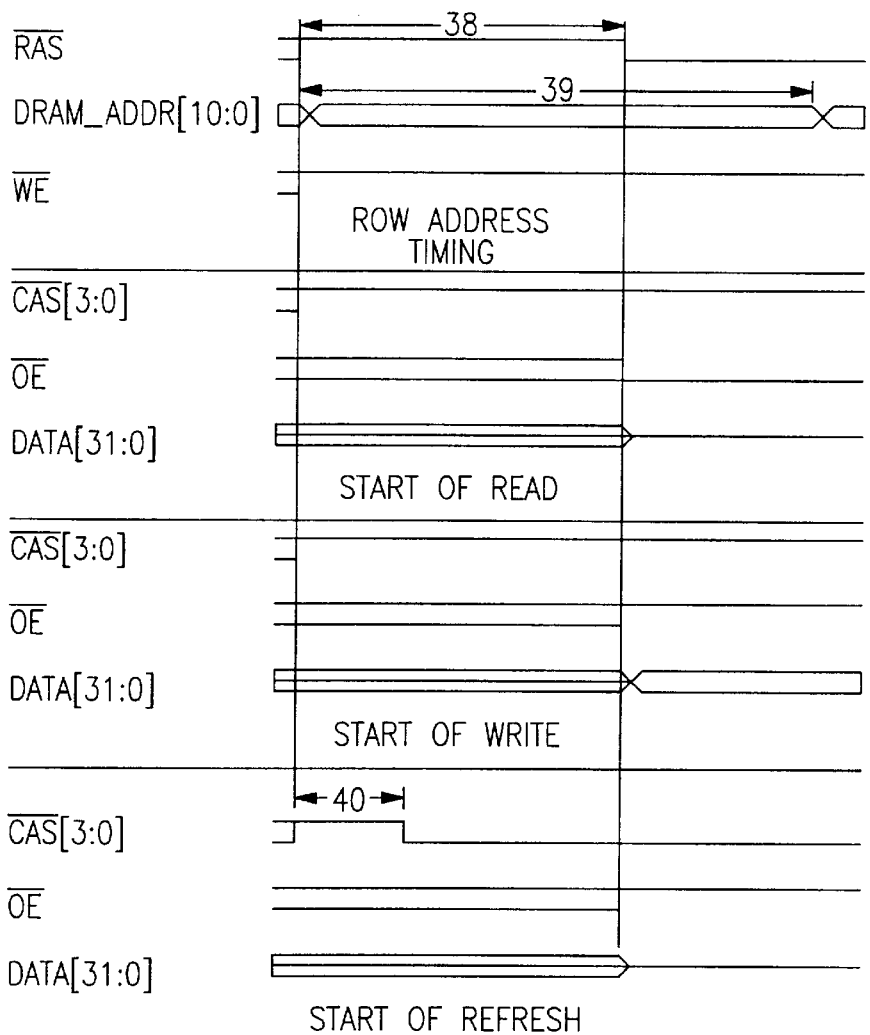
FIG. 42 is a timing diagram illustrating access start timing.
Figure 43:
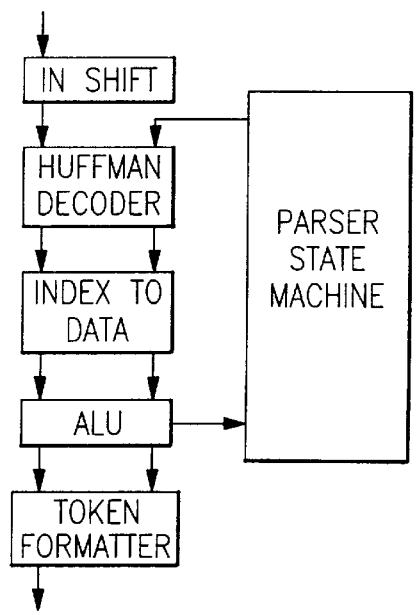
FIG. 43 is a block diagram of a Huffman decoder and parser.
Figure 44:
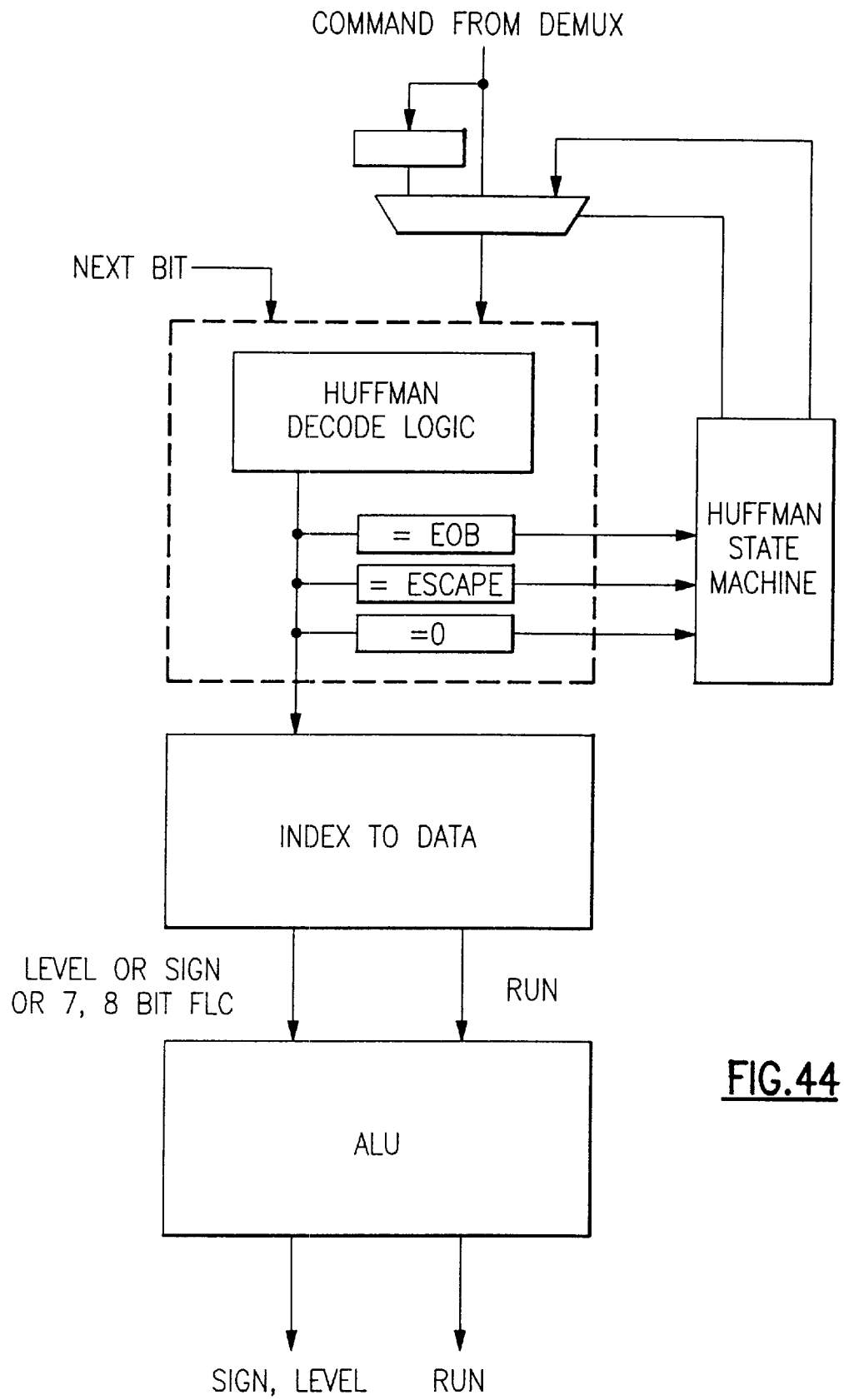
FIG. 44 is a block diagram illustrating the process of H.261 and MPEG AC coefficient decoding.
Figure 45:
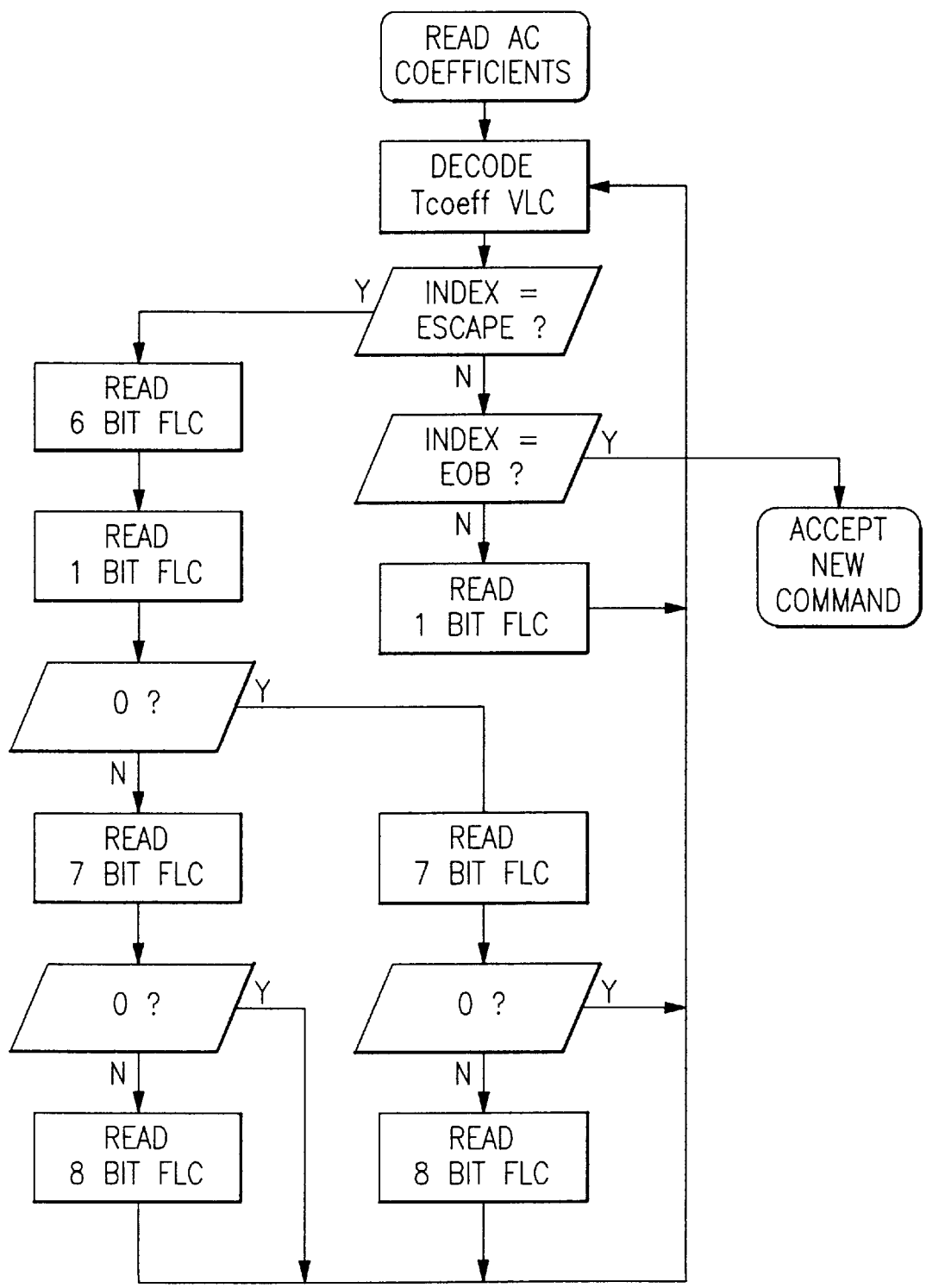
FIG. 45 is a flow chart further illustrating the process of H.261 and MPEG AC coefficient decoding.
Figure 46:
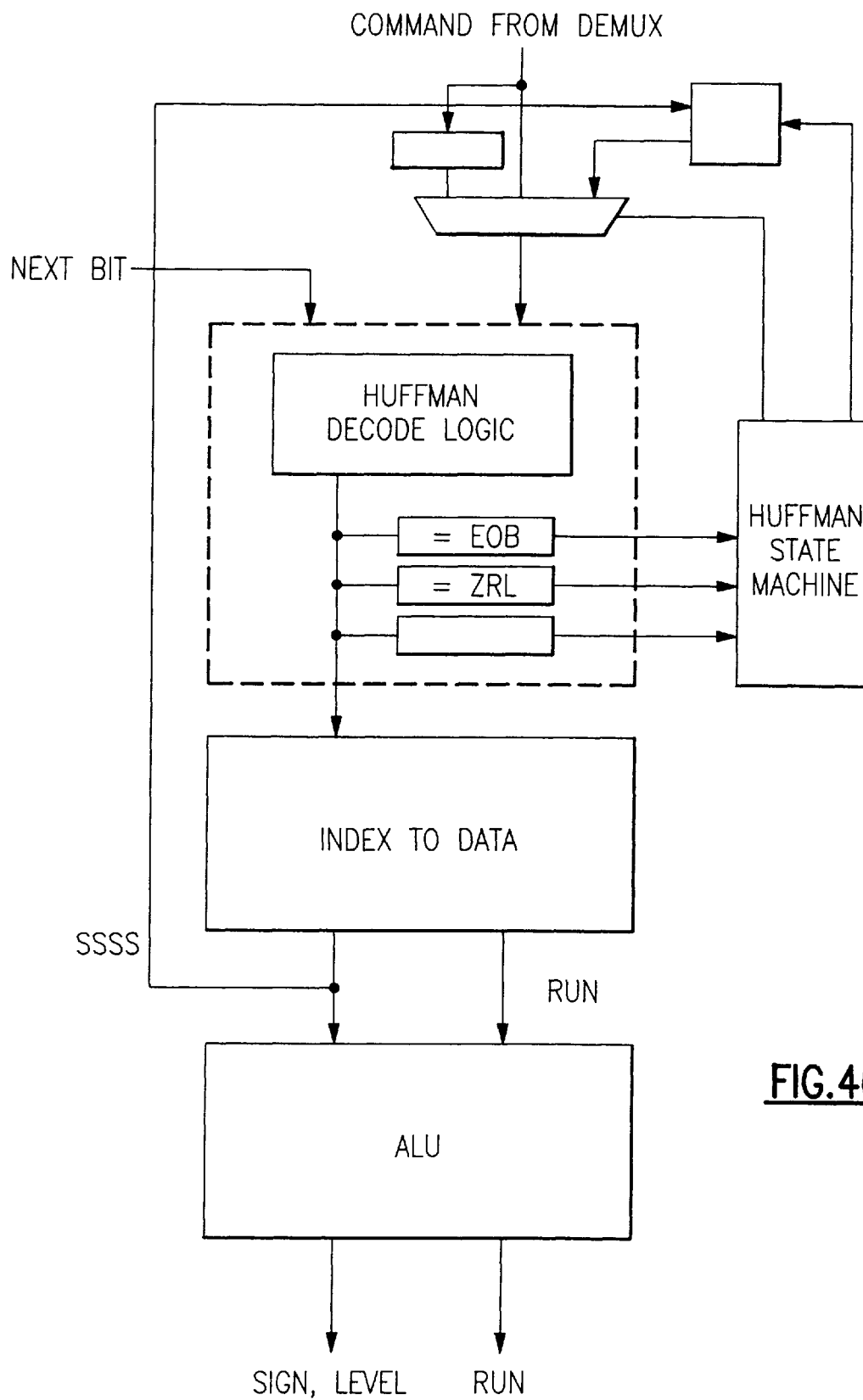
FIG. 46 is a block diagram showing the process of JPEG (AC and DC) coefficient decoding.
Figure 47:
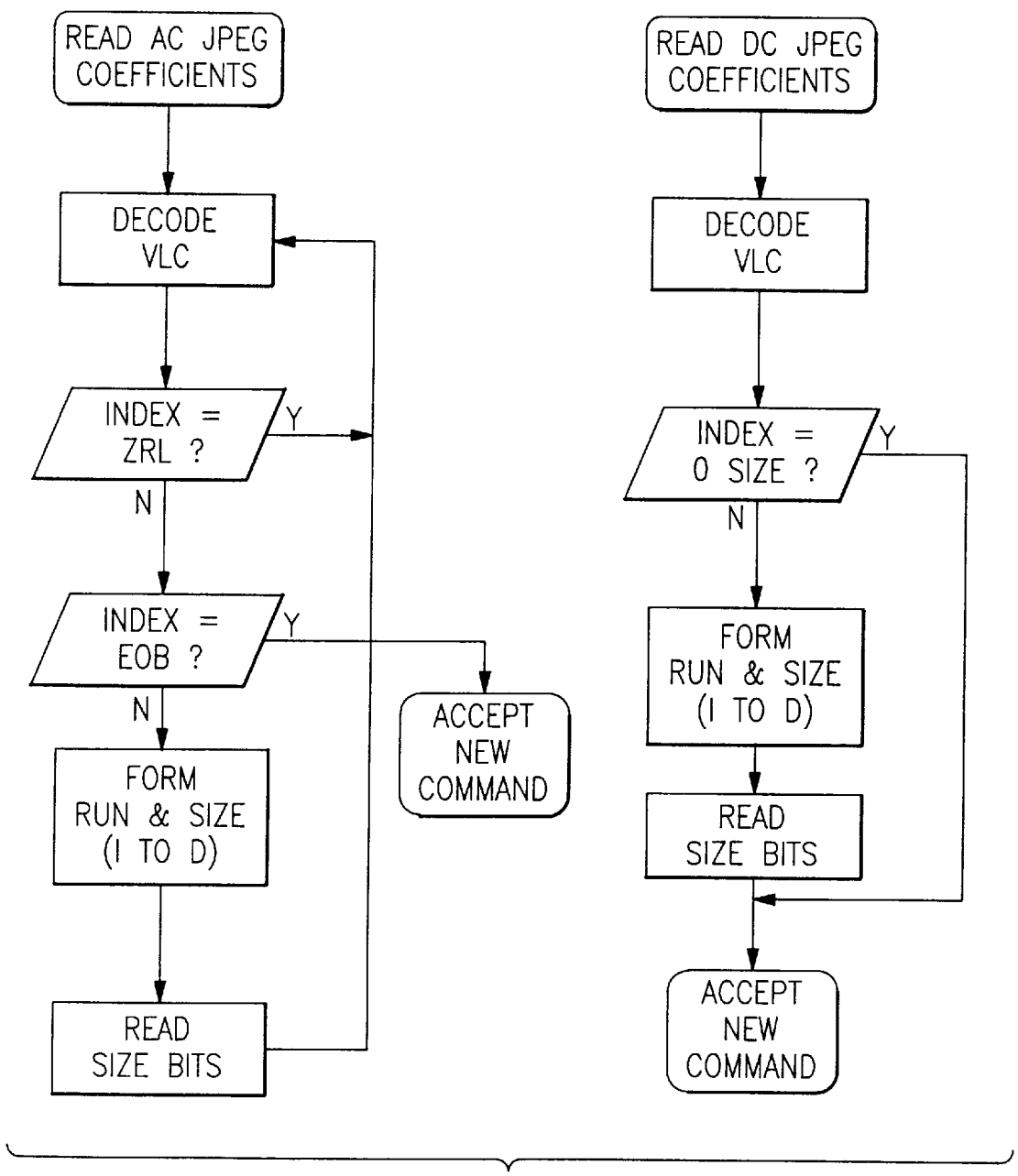
FIG. 47 is a flow chart further illustrating the process of JPEG (AC and DC) coefficient decoding.
Figure 48:
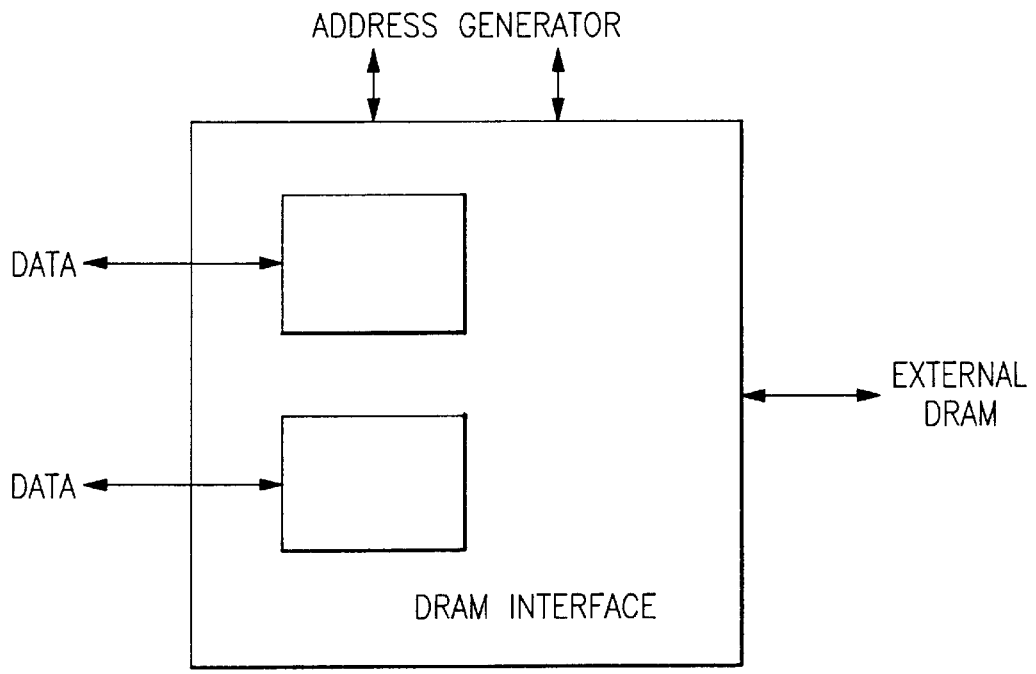
FIG. 48 is a block diagram of a DRAM interface.
Figure 49:
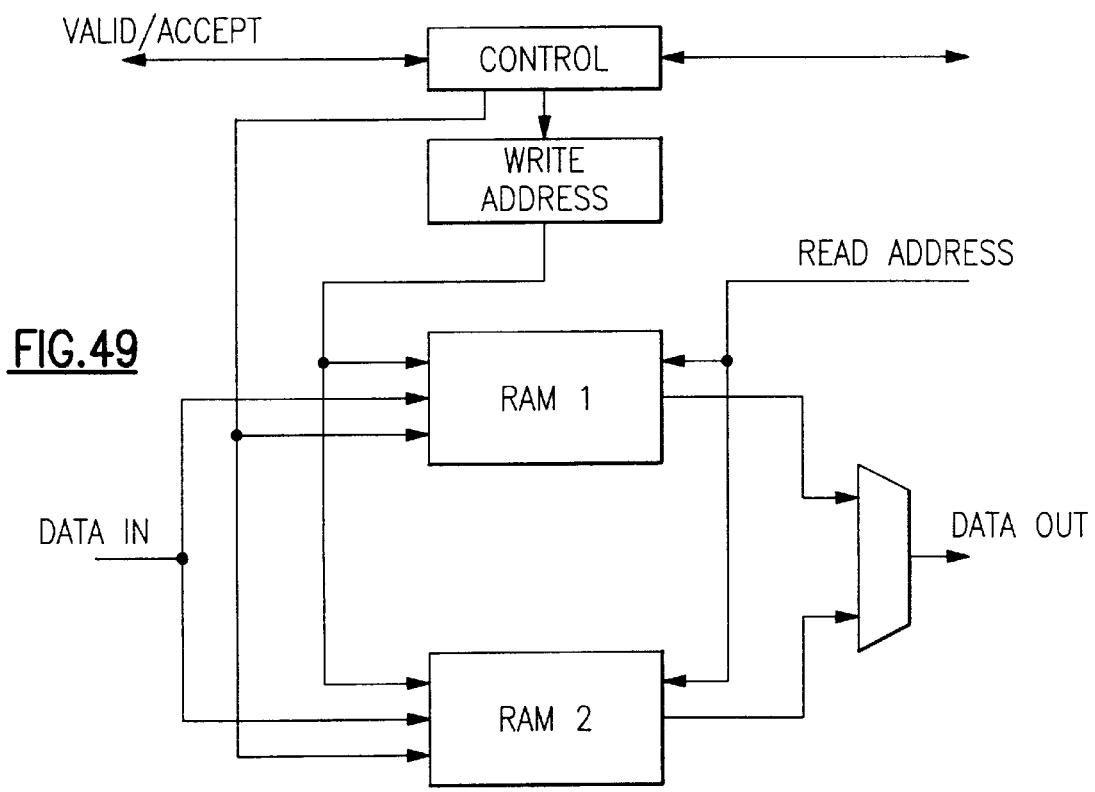
FIG. 49 is a block diagram of a write swing buffer.
Figure 50:
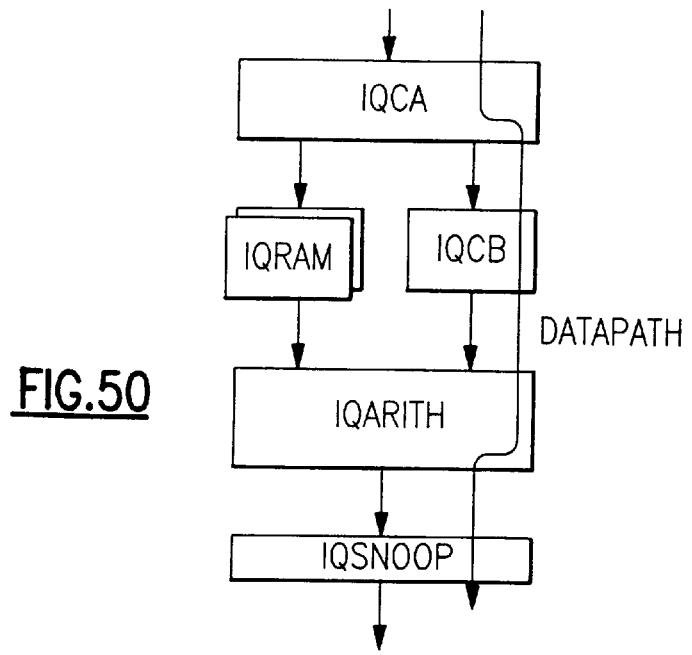
FIG. 50 is an iq block diagram used in an inverse quantizer.
Figure 51:
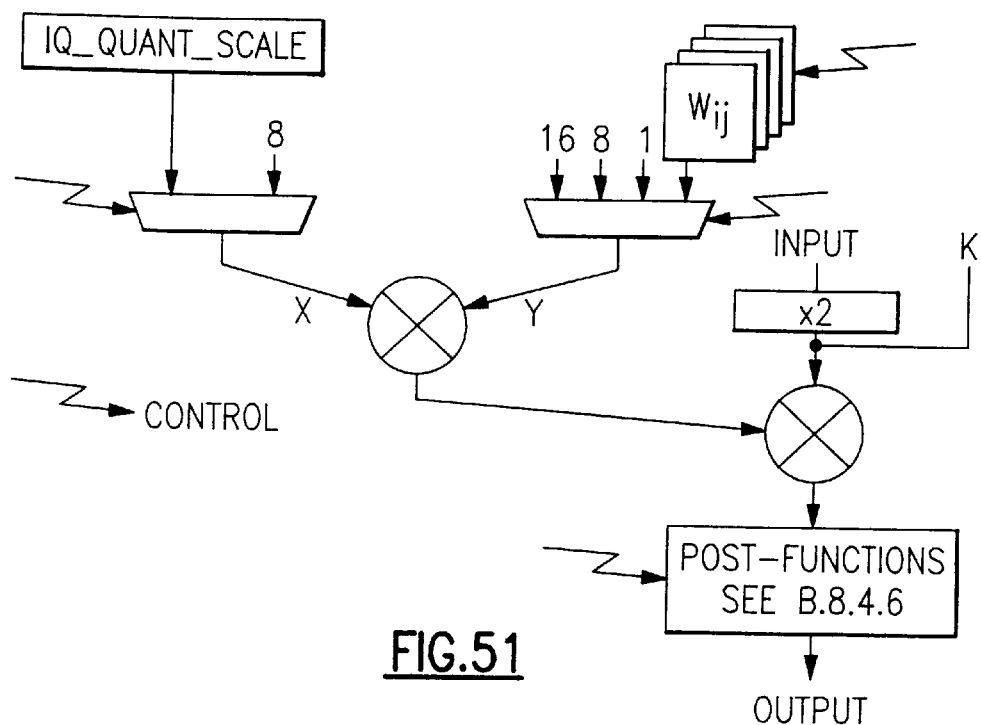
FIG. 51 is a diagram illustrating an arithmetic block of an inverse quantizer.
Figure 52:
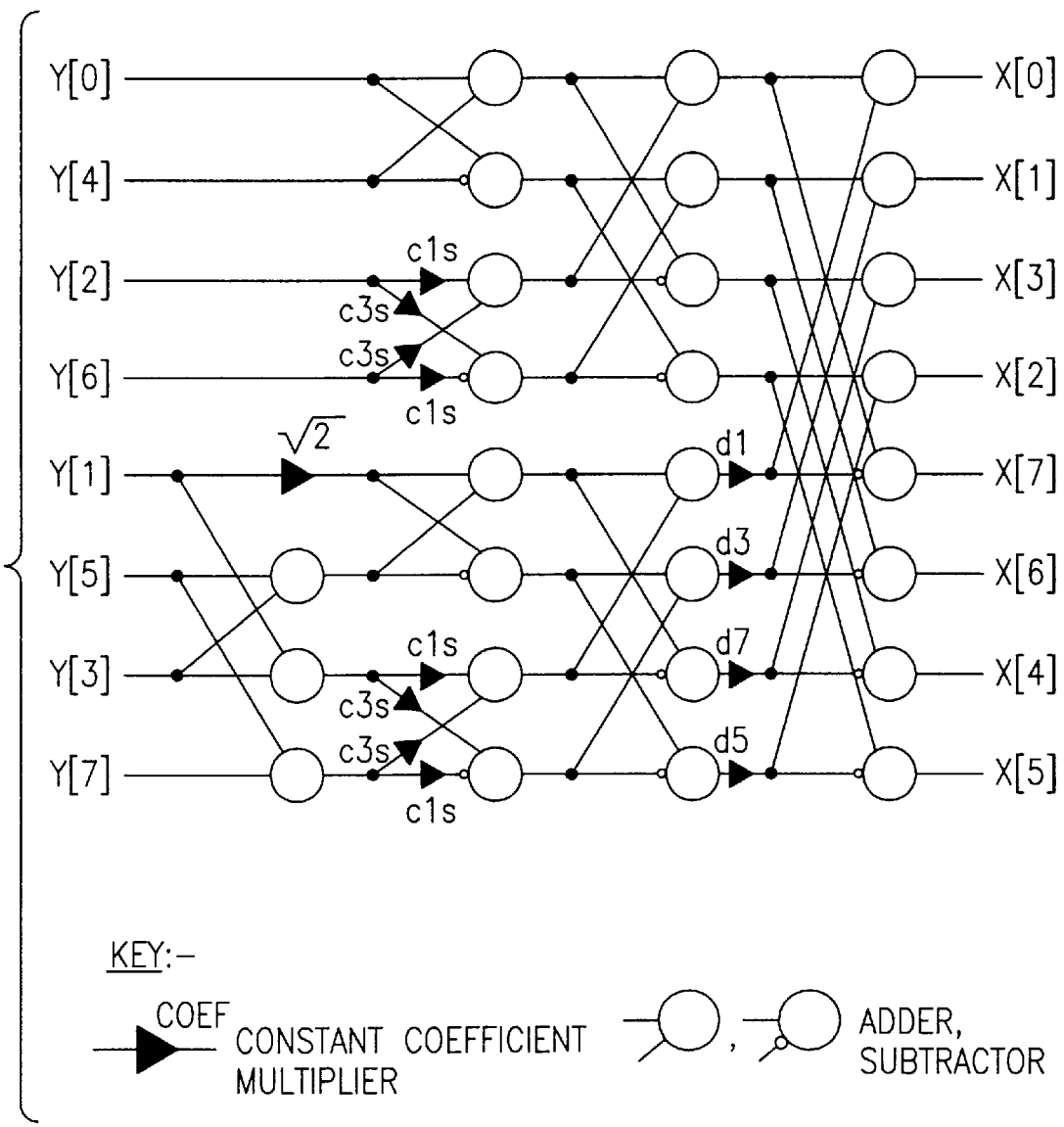
FIG. 52 illustrates an IDCT one dimensional transform algorithm.
Figure 53:
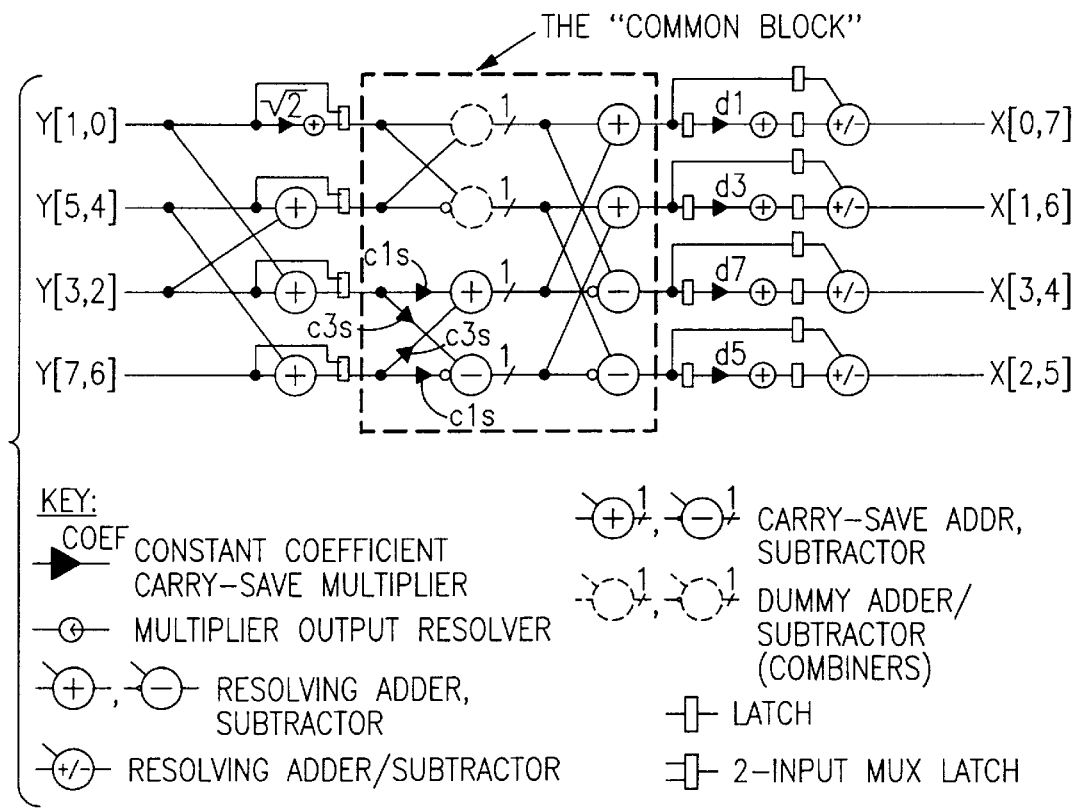
FIG. 53 is another diagram illustrating an IDCT one dimensional transform algorithm.
Figure 56:
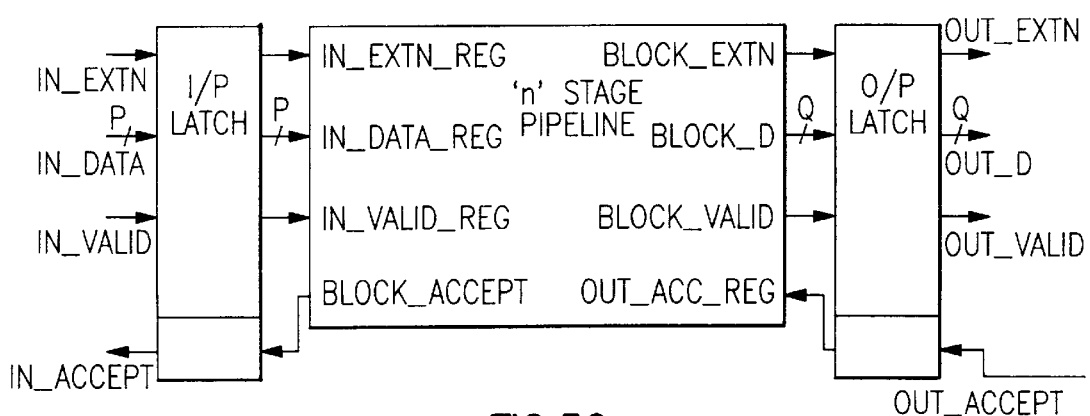
FIG. 56 is a block diagram of a standard block structure.
Figure 54:
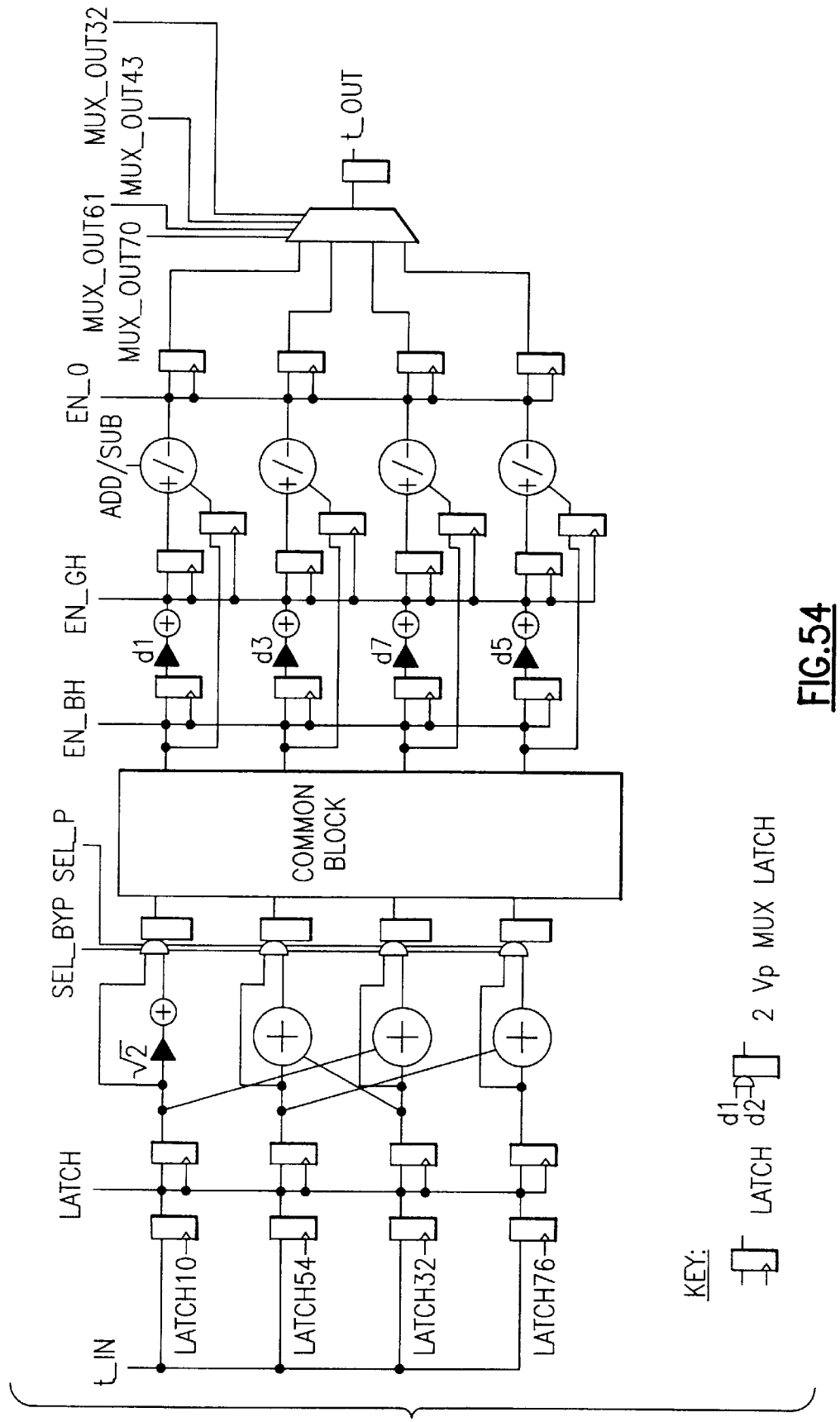
FIG. 54 is a diagram illustrating the micro-architecture of a one dimensional transform.
Figure 55:
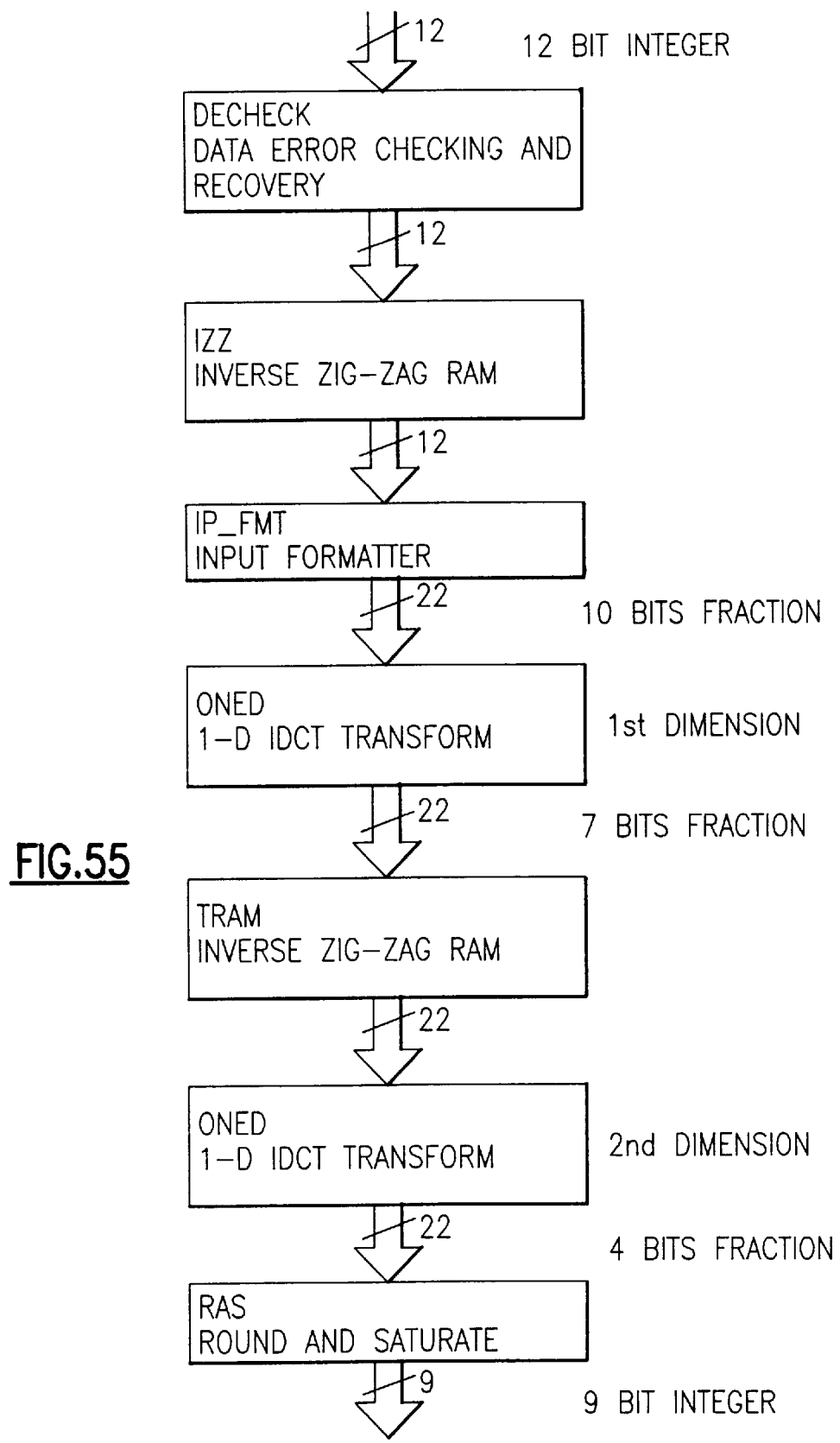
FIG. 55 is a block diagram of a token stream.
Figure 57:
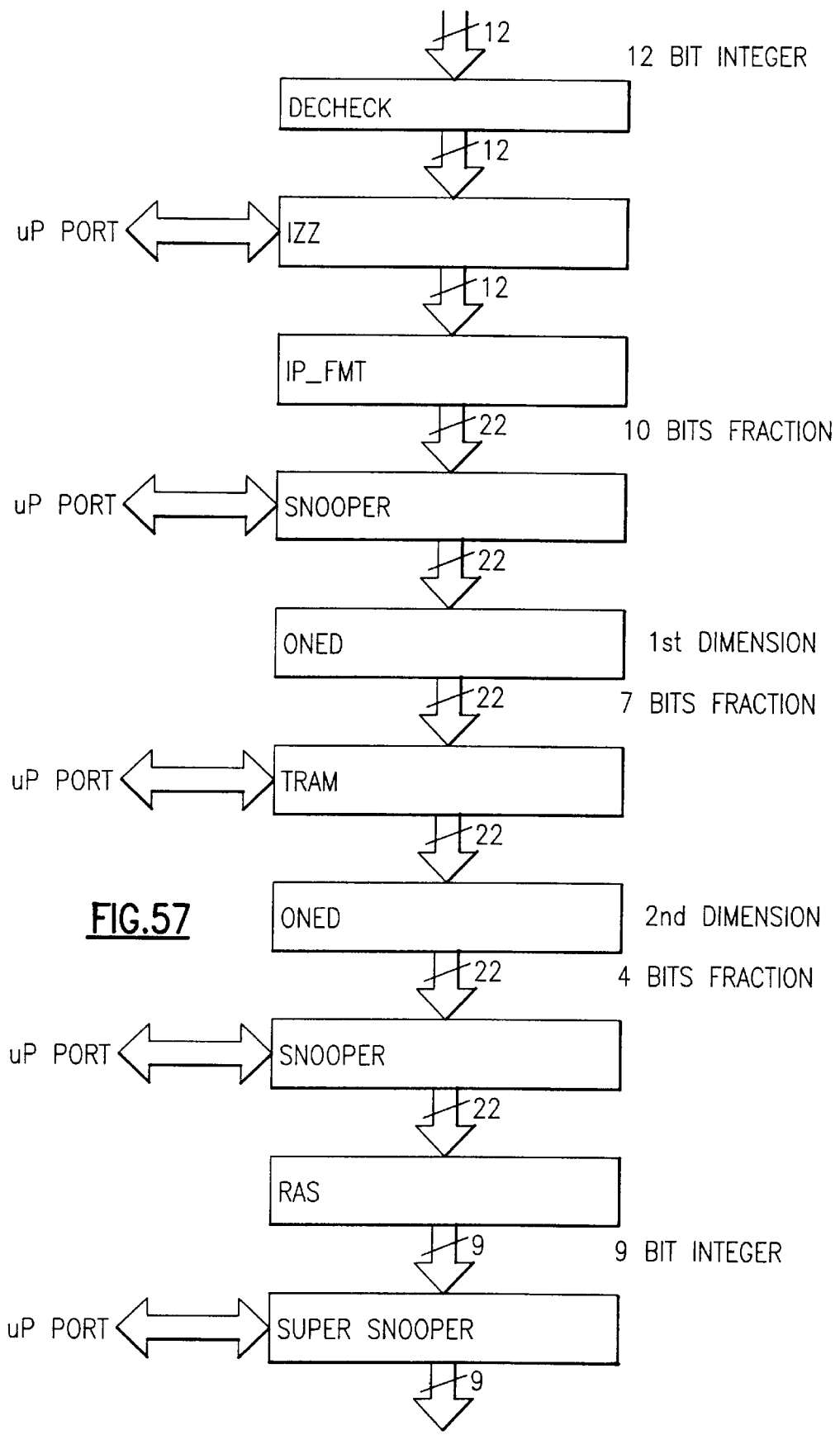
FIG. 57 is a block diagram illustrating microprocessor test access to the IDCT circuitry.
Figure 58:
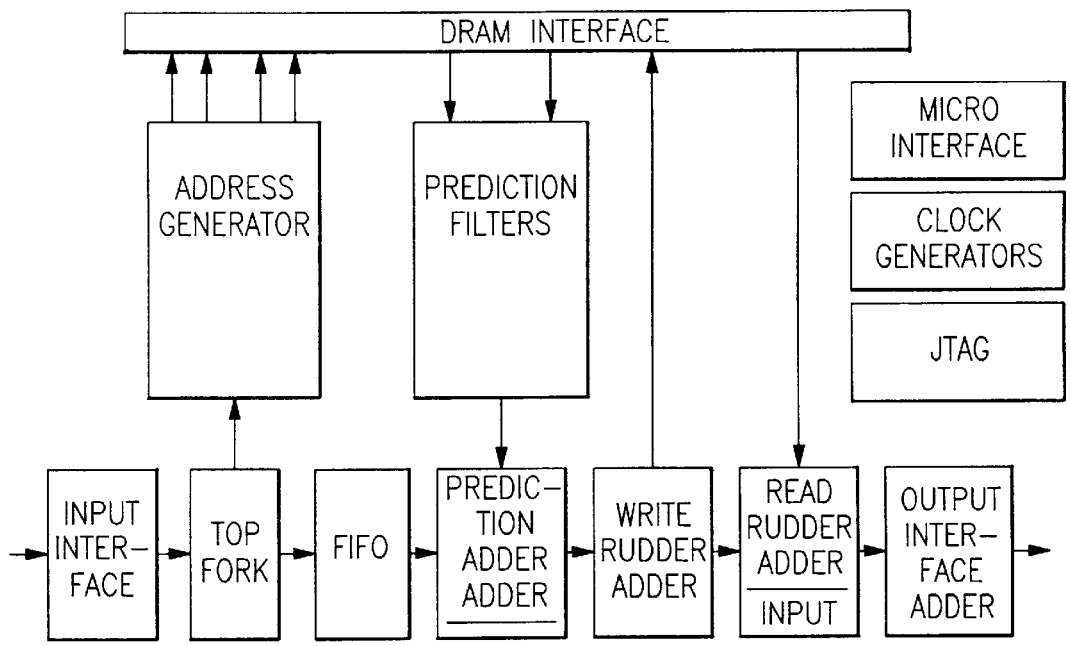
FIG. 58 is a block diagram of a temporal decoder.
Figure 59:
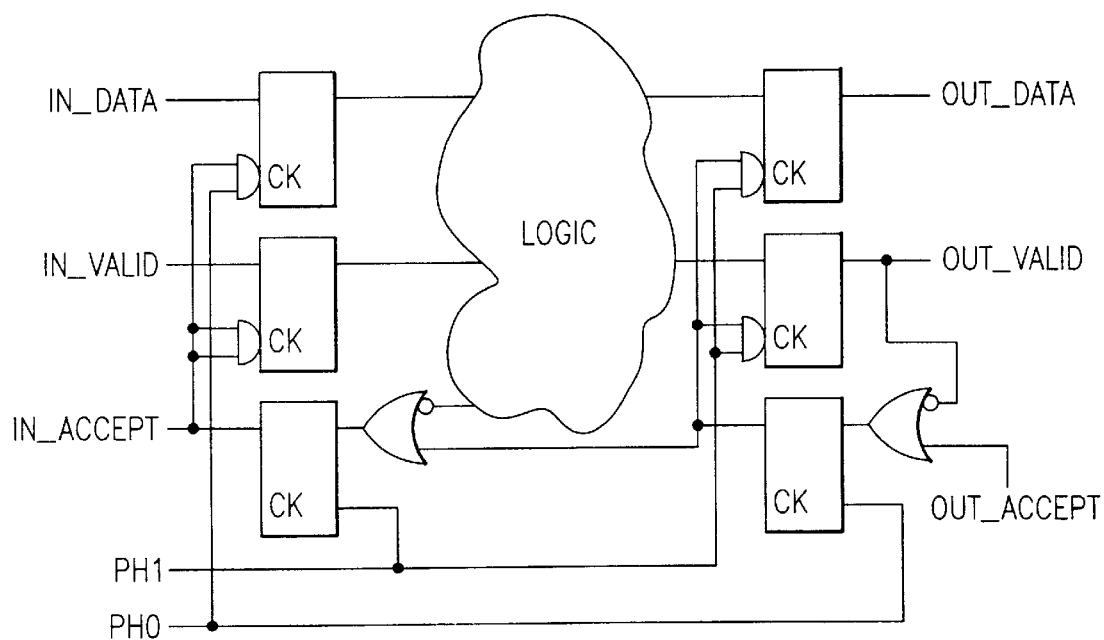
FIG. 59 is a diagram illustrating the structure of a two-wire interface stage.
Figure 60:
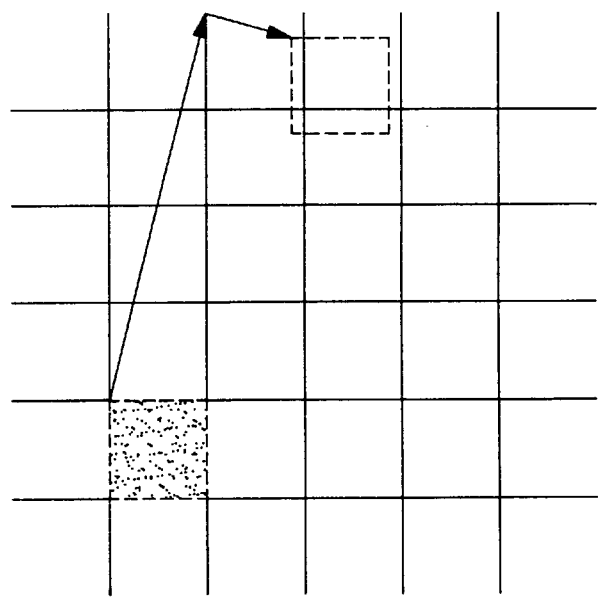
FIG. 60 is a diagram illustrating block and pixel offsets.
Figure 61:
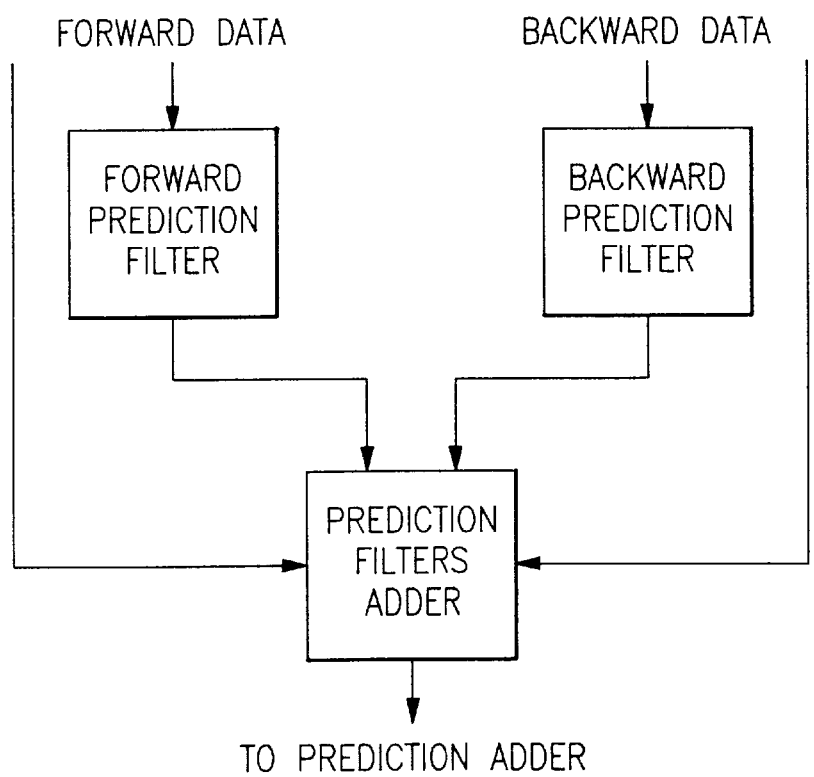
FIG. 61 is a block diagram of a portion of a prediction filter.
Figure 62:
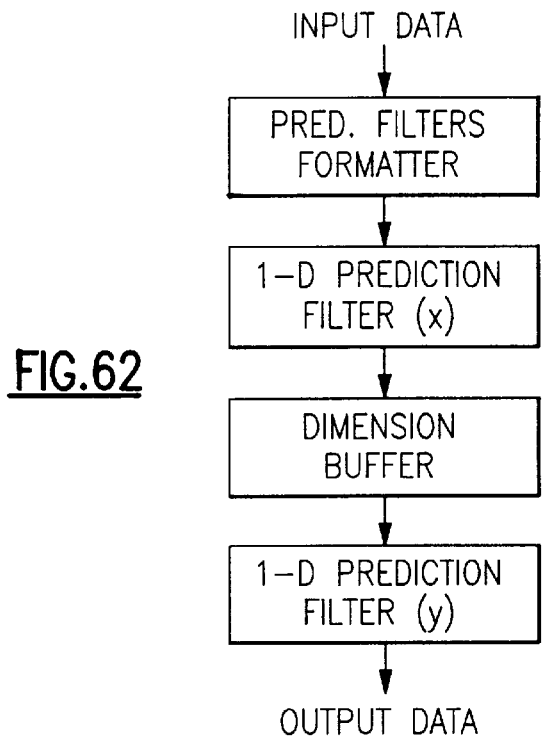
FIG. 62 is a block diagram of a prediction filter.
Figure 63:
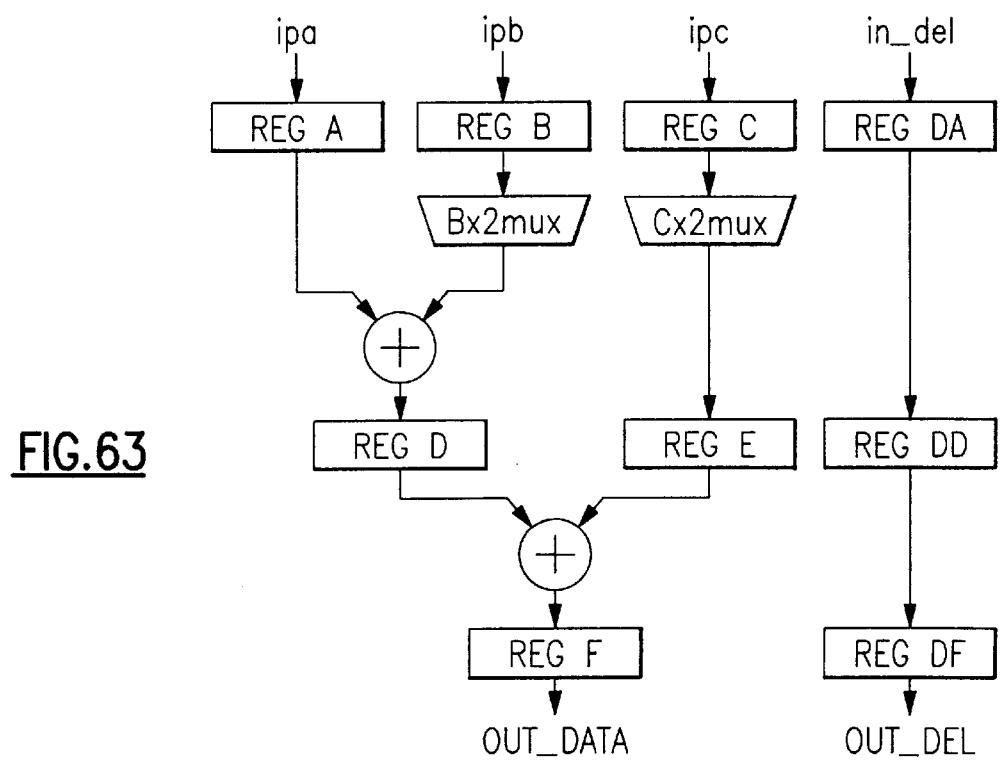
FIG. 63 is a block diagram of a one dimensional prediction filter.
Figure 64:
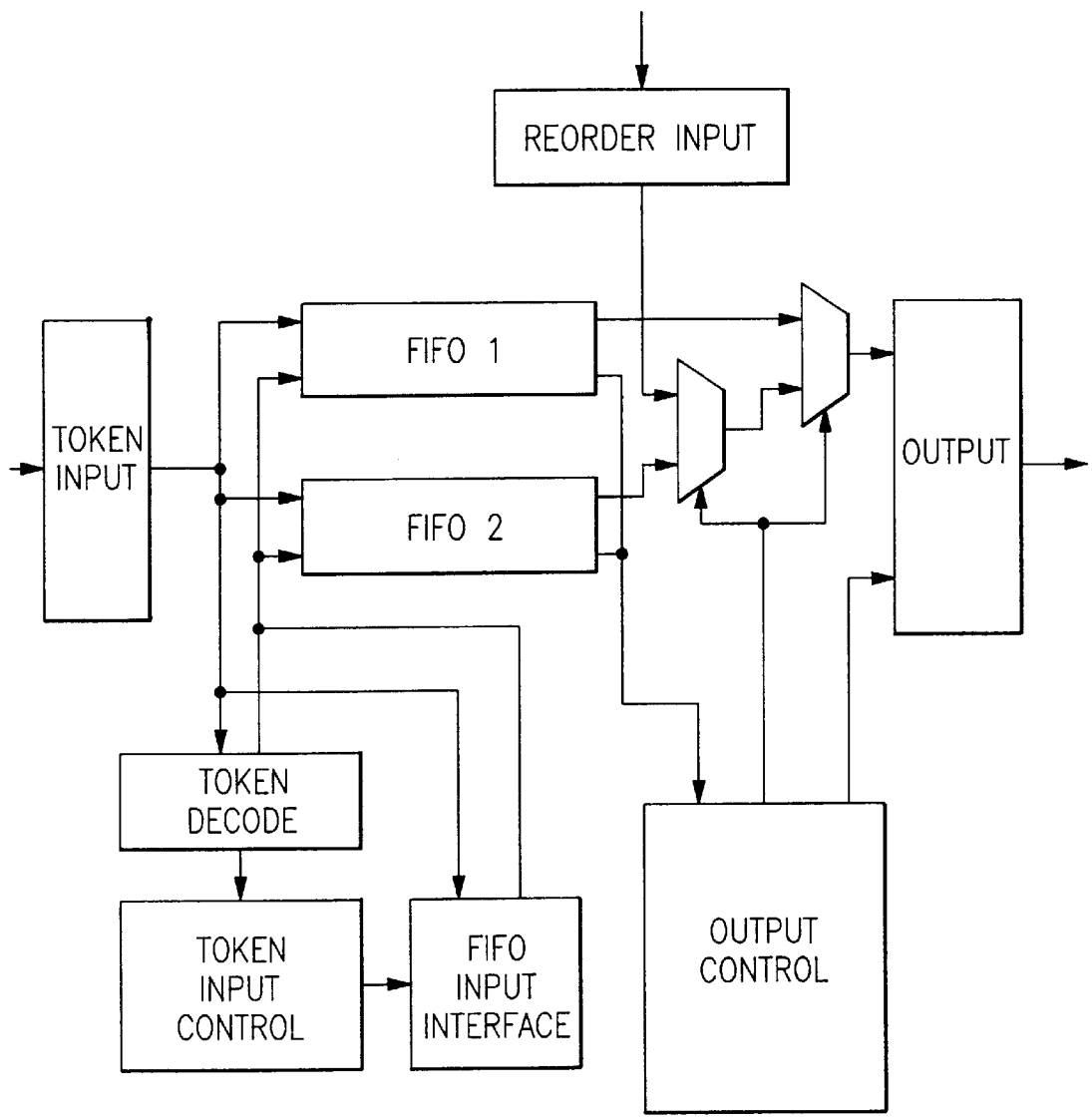
FIG. 64 is a block diagram of the structure of a read rudder in a prediction filter.
Figure 65:
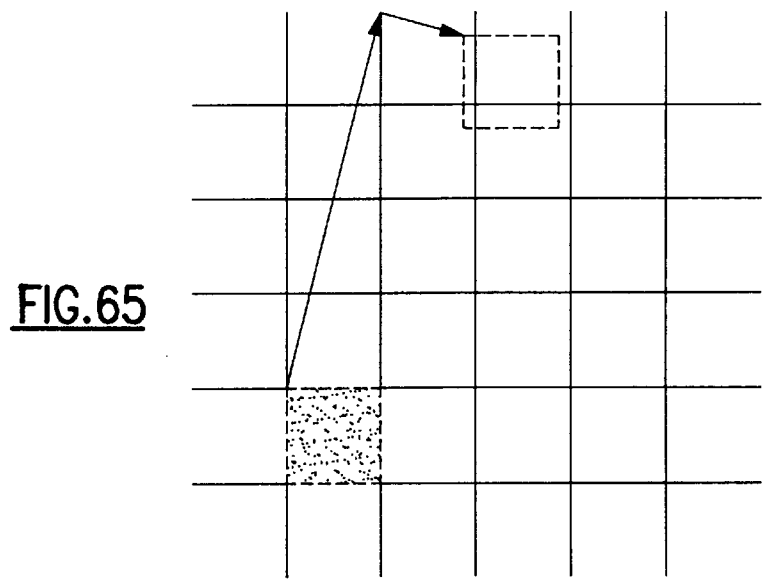
FIG. 65 is another diagram showing block and pixel offsets.
Figure 66:
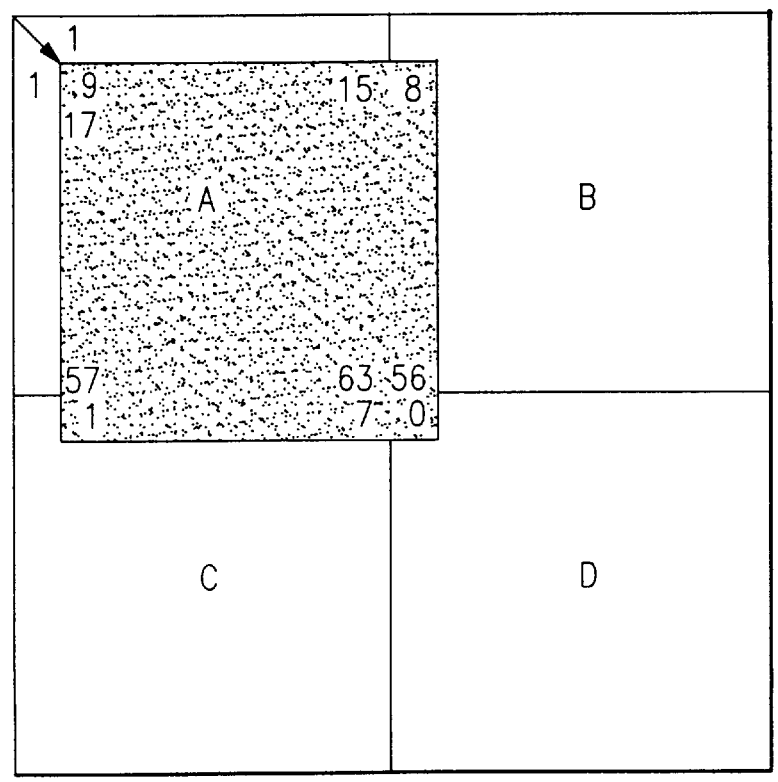
FIG. 66 illustrates a prediction example.

The following section describes the operation of a DRAM interface which has one write swing buffer 210 and one read swing buffer 220, and may be understood with reference to FIG. 18.

A control 230 interfaces between the address generator 240, the DRAM interface 250, and the remaining blocks of the chip which supply and take the data are all two wire interfaces. The address generator may either generate addresses as the result of receiving control tokens, or it may merely generate a fixed sequence of addresses. The DRAM interface treats the two wire interfaces with the address generator in a special way. Instead of keeping the accept line high when it is ready to receive and address, it waits for the address generator to supply a valid address, processes that address, and then sets the accept line high for one clock period. Thus it implements a request/acknowledge (REQ/ACK) protocol.

A unique feature of the DRAM interface is its ability to communicate independently with the address generator and with the blocks which provide or accept the data. For example, the address generator may generate an address associated with the data in the write swing buffer, but no action will be taken until the write swing buffer signals that there is a block of data ready to be written to the external DRAM. Similarly, the write swing buffer may contain a block of data which is ready to be written to the external DRAM, but no action is taken until an address is supplied on the appropriate bus from the address generator. Further, once one of the RAMs in the write swing buffer has been filled with data, the other may be completely filled and "swung" to the DRAM interface side before the data input is stalled (the two-wire interface accept signal set low).

In understanding the operation of the DRAM interface, it is important to note that in a properly configured system, the DRAM interface will be able to transfer data between the swing buffers and the external DRAM at least as fast as the sum of all the average data rates between the swing buffers and the rest of the chip.

Each DRAM interface contains a method of determining which swing buffer it will service next. In general, this will either be a "round robin" (i.e. the swing buffer which is serviced is the next available swing buffer which has least recently had a turn) or a priority encoder, (i.e. in which some swing buffers have a higher priority than others). In both cases, an additional request will come from a refresh request generator which has a higher priority than all the other requests. The refresh request is generated from a refresh counter which can be programmed via a microprocessor interface.

The write swing buffer interface two blocks of RAM, RAM1 and RAM2. As discussed further herein, data is written into RAM 1 and RAM 2 from the previous block or stage, under control of the write address and control. From RAM1 and RAM 2, the data is written into DRAM. When writing data into DRAM, the DRAM row address is provided by the address generator, and the column address is provided by the write address and control, as described further herein. In operation, valid data is presented at the input (data in). The data is received from the previous stage. As each piece of data is accepted by the DRAM interface, it is written into RAM1 and the write address control increments the RAM1 address to allow the next piece of data to be written into RAM1. Data continues to be written into RAM1 until either there is no more data, or RAM1 is full. When RAM1 is full, the input side gives up control and sends a signal to the read side to indicate that RAM1 is now ready to be read. This signal passes between two asynchronous clock regimes, and so passes through three synchronizing flip flops.

Provided RAM2 is empty, the next item of data to arrive on the input side is written into RAM2, otherwise, this occurs when RAM2 has emptied. When the round robin or priority encoder (depending on which is used by the particular chip) indicates that it is the turn of this swing buffer to be read, the DRAM interface reads the contents of RAM1 and writes them to the external DRAM. A signal is then sent back across the asynchronous interface, to indicate that RAM1 is now ready to be filled again.

If the DRAM interface empties RAM1 and "swings" it before the input side has filled RAM2, then data can be accepted by the swing buffer continually. Otherwise when RAM2 is filled the swing buffer will set its accept single low until RAM1 has been "swung" back for use by the input side.

The operation of a read swing buffer is similar, but with input and output data busses reversed.

The DRAM interface is designed to maximize the available memory bandwidth. Each 8×8 block of data is stored in the same DRAM page. In this way, full use can be made of DRAM fast page access modes, where one row address is supplied followed by many column addresses. In particular, row addresses are supplied by the address generator, while column addresses are supplied by the DRAM interface, as discussed further below.

In addition, the facility is provided to allow the data bus to the external DRAM to be 8, 16 or 32 bits wide, so that the amount of DRAM used can be matched to size and bandwidth requirements of the particular application.

In this example, the address generator provides the DRAM interface with block addresses for each of the read and write swing buffers. This address is used as the row address for the DRAM. The six bits of column address are supplied by the DRAM interface itself, and these bits are also used as the address for the swing buffer RAM. The data bus to the swing buffers is 32 bits wide, so if the bus width to the external DRAM is less than 32 bits, two or four external DRAM accesses must be made before the next word is read from a write swing buffer or the next word is written to a read swing buffer (read and write refer to the direction of transfer relative to the external DRAM).

It should be recognized that the DRAM interface is not limited to two swing buffers.

What is claimed is:

1. A memory interface for connecting a bus to a random-access memory reconfigurable for multi-standard operation, comprising:
   a receiver component configured to receive from the bus a plurality of data words comprising multiword tokens;
   an address component configured to receive from the bus a complete address associated with the plurality of data words;
   an address generator configured to generate a series of addresses in the memory into which the buffered data words will be written;
   a writer configured to write the buffered data words into the memory at the generated addresses; and
   a buffer component configured to buffer the received data words comprising:
      at least three memory buffers for use as a swing buffer including an arrival buffer, an output buffer and at least one intermediate buffer.

2. The memory interface of claim 1, wherein:
   the memory operates in page addressing mode and the address generator includes a row address generator configured to generate row addresses and a column address generator configured to generate column addresses based on the received address.

3. The memory interface of claim 1, wherein: the memory is a DRAM;
   a first two-wire interface is disposed between said bus and said address generator; and
   the receiver component includes a second two-wire interface; wherein said first two-wire interface and said second two-wire interface each comprise: a sender, a receiver, and a clock connected to said sender and said receiver, wherein data is transferred from said sender to said receiver upon a transition of said clock only when said sender is ready and said receiver is ready.

4. The memory interface of claim 1, further comprising means for determining whether the receiver component has received and buffered the plurality of data words.

5. The memory interface according to claim 1, wherein said tokens each comprise a plurality of data words, said data words each including an extension bit which indicates a presence of additional words in said token.

6. A memory interface for connecting a bus to a random-access memory, comprising:
   one or more swing buffers configured to receive from the bus a plurality of data words and to buffer the received data words;
   an address receiver configured to receive from the bus an address associated with the plurality of data words;
   an address generator configured to generate a series of addresses in the memory into which the buffered data words will be written, the series of addresses being derived from the received address; and
   a writer configured to write the buffered data words into the memory at the generated addresses.

7. The memory interface of claim 6, wherein:
   the memory operates in page addressing mode; and
   the address generator includes a row address generator for generating row addresses and a column address generator for generating column addresses based on the received address.

8. The memory interface of claim 6, wherein:
   the memory is one or more DRAMs;
   the bus includes a two-wire interface;
   the swing buffers includes a two-wire interface;
   the address receiver includes a two-wire interface;
   the plurality of data words are in the form of a token; and
   the received address is in the form of a token.

9. The memory interface of claim 6, further comprises means for determining whether the one or more swing buffers has received and buffered the plurality of data words.

10. A memory interface for connecting a bus to a random-access memory reconfigurable for multi-standard operation, comprising:
    a plurality of data words stored in the memory at predetermined addresses;
    an address receiver configured to receive from the bus a memory address associated with the plurality of data words;
    an address generator configured to generate a series of memory addresses for addressing the plurality of data words in the memory, the series of addresses being derived from the received address;
    swing buffers for buffering data words read from the memory; and
    a reader for reading from the memory the plurality of data words, using the series of memory addresses generated by the address generator, and writing the data words into the buffer.

11. The memory interface of claim 10 wherein:
    the memory operates in page addressing mode; and
    the address generator includes a row address generator configured to generate row addresses and a column address generator configured to generate column addresses based on the received address.

12. The memory interface of claim 10 wherein:
    the memory is a DRAM;
    the bus includes a two-wire interface;
    the swing buffers include a two-wire interface; and
    the address receiver includes a two-wire interface.

13. A system for processing multi-standard data for a stage of a pipeline, comprising:
    an external random-access memory for storing the data;

an address generator configured to generate an address associated with the data;

a memory interface receiving the data from a component of the stage and transferring said data to the random-access memory as defined by the address generated by the address generator; and one or more swing buffers comprising a pair of RAMS such that the memory interface fills one of the RAMS while another component of the stage fills the other RAM.

14. The system of claim 13, wherein the random-access memory is a DRAM.

15. The system of claim 13, wherein the multi-standard is one of H.261, JPEG, and MPEG.

16. The system of claim 13, wherein the stage is a spatial decoder.

17. The system of claim 16, wherein one of the swing buffers is used to transfer coded data to the random-access memory, another to read coded data from the random-access memory, a third to transfer tokenized data to the random-access memory and a fourth to read tokenized data from the random-access memory.

18. The system of claim 13, wherein the stage is a temporal decoder.

19. The system of claim 18, wherein one of the swing buffers is used to write intra or predicted data into the random-access memory, a second to read intra or predicated data from the random-access memory and the other two to read forward and backward predication data.

20. The system of claim 13, wherein the stage is a video formatter.

21. The system of claim 20, wherein one swing buffer is used to transfer data to the random-access memory, and the other three are used to read data from the random-access memory, one for each of luminance (Y) and the red and blue color difference (Cr and Cb).

22. The system of claim 18, further comprising:

a control interface between the address generator and the memory interface.

* * * * *